(12) United States Patent
Fukuda et al.

(10) Patent No.: US 11,140,311 B2
(45) Date of Patent: Oct. 5, 2021

(54) DETECTING APPARATUS AND DETECTING METHOD

(71) Applicant: CANON KABUSHIKI KAISHA, Tokyo (JP)

(72) Inventors: Koichi Fukuda, Tokyo (JP); Yu Inagaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 16/442,166

(22) Filed: Jun. 14, 2019

(65) Prior Publication Data

US 2019/0394407 A1    Dec. 26, 2019

(30) Foreign Application Priority Data

Jun. 21, 2018  (JP) .............................. JP2018-118126
Jun. 21, 2018  (JP) .............................. JP2018-118127

(51) Int. Cl.
*H04N 5/232*     (2006.01)
*H04N 5/225*     (2006.01)

(52) U.S. Cl.
CPC ..... *H04N 5/232122* (2018.08); *H04N 5/2254* (2013.01)

(58) Field of Classification Search
CPC ..................... H04N 5/232122; H04N 5/2254
See application file for complete search history.

(56) References Cited

U.S. PATENT DOCUMENTS

2016/0044230 A1*  2/2016  Yoshimura ....... H04N 5/232122
                                                        348/353

FOREIGN PATENT DOCUMENTS

| CN | 103024264 A | 4/2013 |
|---|---|---|
| CN | 104583831 A | 4/2015 |
| JP | 2000-156823 A | 6/2000 |
| JP | 2015-11283 A | 1/2015 |

* cited by examiner

*Primary Examiner* — Nicholas G Giles
(74) *Attorney, Agent, or Firm* — Canon U.S.A., Inc. IP Division

(57) ABSTRACT

An apparatus includes a generation unit configured to generate a plurality of respective focus detection signals corresponding to different pupil areas by using pixel signals acquired by pixels, and a detection unit configured to calculate an image deviation amount based on the plurality of focus detection signals and detect a defocus amount from the image deviation amount and a conversion coefficient. The detection unit calculates the conversion coefficient based on a pupil eccentric amount of an image sensor, an incident pupil distance of the image sensor, and opening information about a plurality of frames in an imaging optical system.

22 Claims, 25 Drawing Sheets

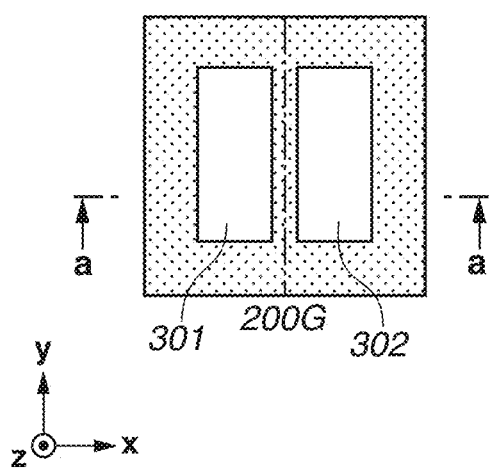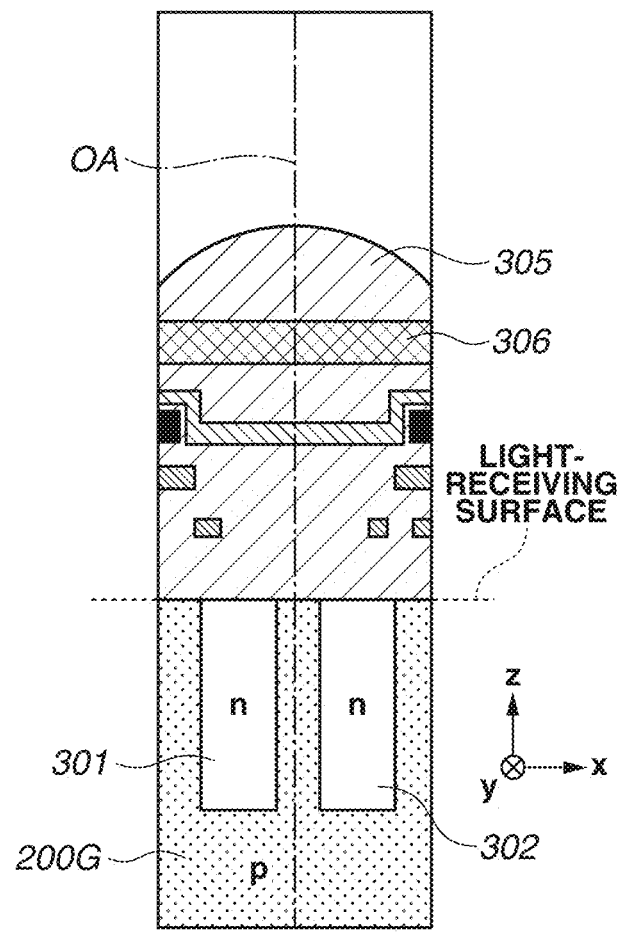

SECTIONAL VIEW
PARALLEL TO OPTICAL AXIS

SECTIONAL VIEW
VERTICAL TO OPTICAL AXIS

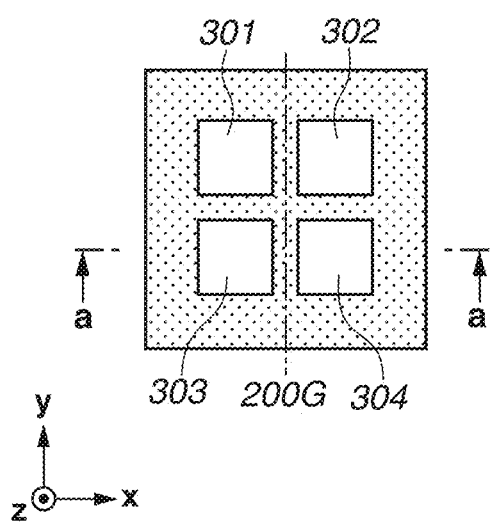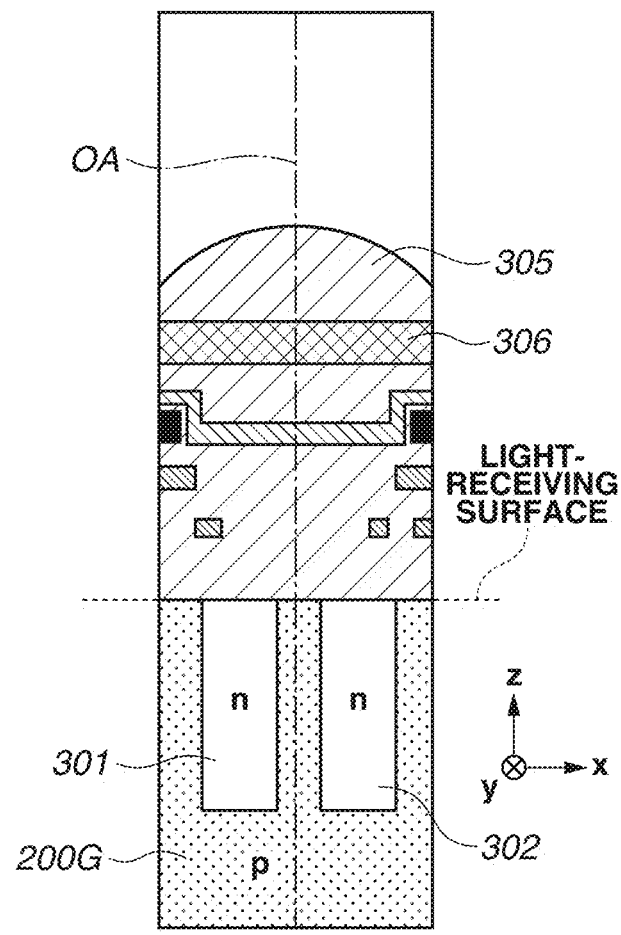

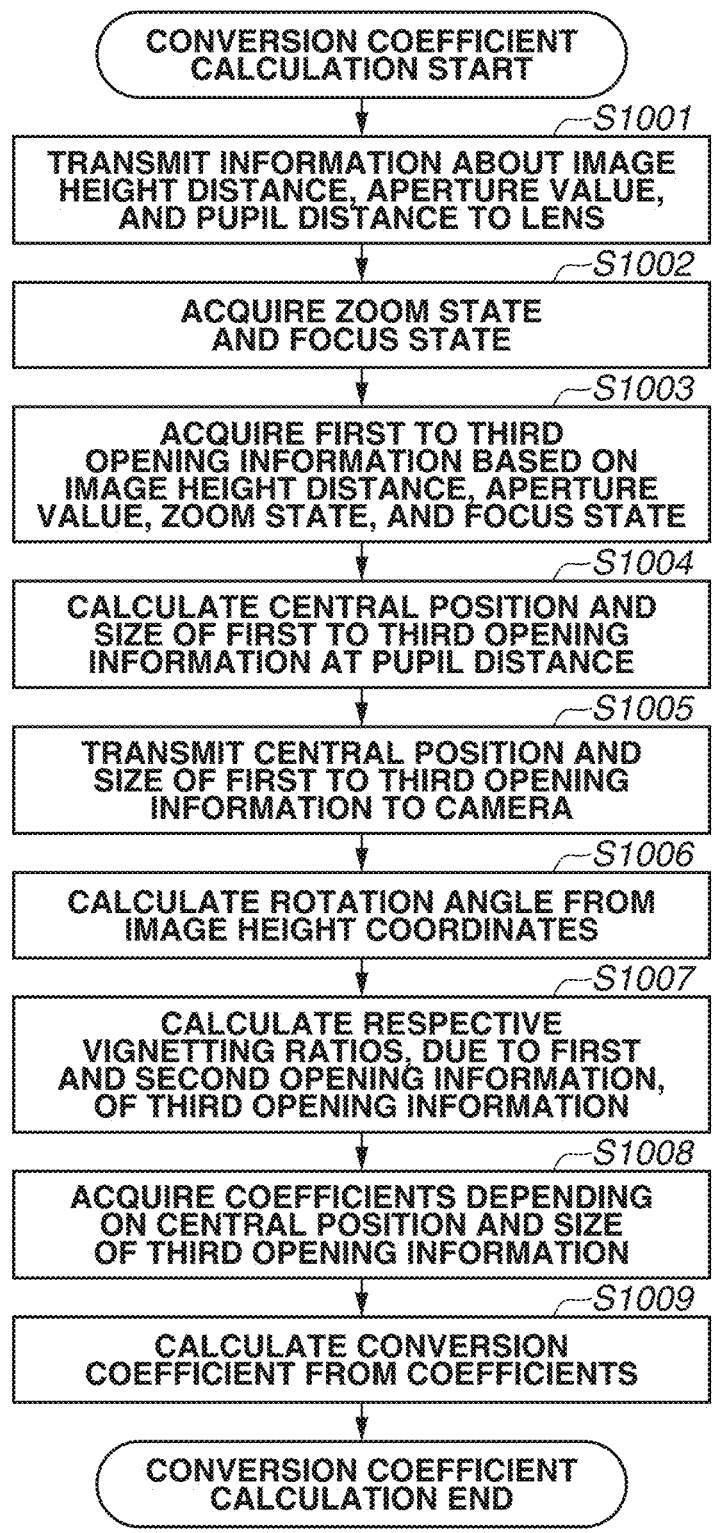

DETECTING APPARATUS AND DETECTING METHOD

BACKGROUND OF THE INVENTION

Field of the Invention

The aspect of the embodiments relates to a detecting apparatus that detects a distance.

Description of the Related Art

An image capturing apparatus that performs focus detection of an image capturing lens by a phase difference detecting method using a two-dimensionally laid-out image sensor having a configuration in which a microlens is formed in each pixel has heretofore been known.

Japanese Patent Application Laid-Open No. 2000-156823 discusses an image capturing apparatus having a configuration in which a pair of focus detection pixels is partially disposed in a two-dimensionally laid-out image sensor composed of a plurality of pixels. A pair of focus detection pixels receives light from different areas of an exit pupil of an image capturing lens via a light-shielding layer including an opening portion, and pupil division is performed. Specifically, image capturing signals are acquired by image capturing pixels arranged in the most part of the two-dimensionally laid-out image sensor, and an image deviation amount is obtained based on focus detection signals from the focus detection pixels arranged in a part of the two-dimensionally laid-out image sensor, thereby performing the focus detection.

In addition, Japanese Patent Application Laid-Open No. 2015-11283 discusses an image capturing apparatus that calculates an effective aperture value based on an image height from a reference aperture value at a middle image height of an optical system, and calculates a conversion coefficient for converting an image deviation amount into a defocus amount by using the calculated effective aperture value. Even if lens frame vignetting occurs due to a plurality of lens frames and diaphragm frames and the effective aperture value changes from lens to lens, the conversion coefficient can be calculated using the effective aperture value.

SUMMARY OF THE INVENTION

According to an aspect of the embodiments, an apparatus includes an image sensor including an array of a plurality of pixels configured to receive light having passed through different pupil areas in an imaging optical system, a generation unit configured to generate a plurality of respective focus detection signals corresponding to the different pupil areas by using the pixel signals acquired by the pixels, and a detection unit configured to calculate an image deviation amount based on the plurality of focus detection signals and detect a defocus amount from the image deviation amount and a conversion coefficient. The detection unit calculates the conversion coefficient based on a pupil eccentric amount of the image sensor, an incident pupil distance of the image sensor, and opening information about a plurality of frames in the imaging optical system.

Further features of the disclosure will become apparent from the following description of exemplary embodiments with reference to the attached drawings.

BRIEF DESCRIPTION OF THE DRAWINGS

FIG. 3A is a plan view of a pixel structure according to the first exemplary embodiment, and FIG. 3B is a sectional view of the pixel structure according to the first exemplary embodiment.

FIG. 19A is a plan view of a pixel structure according to the second exemplary embodiment, and FIG. 19B is a sectional view of the pixel structure according to the second exemplary embodiment.

FIG. 22 is a flowchart illustrating a conversion coefficient calculation according to the third exemplary embodiment.

DESCRIPTION OF THE EMBODIMENTS

Figure 1:
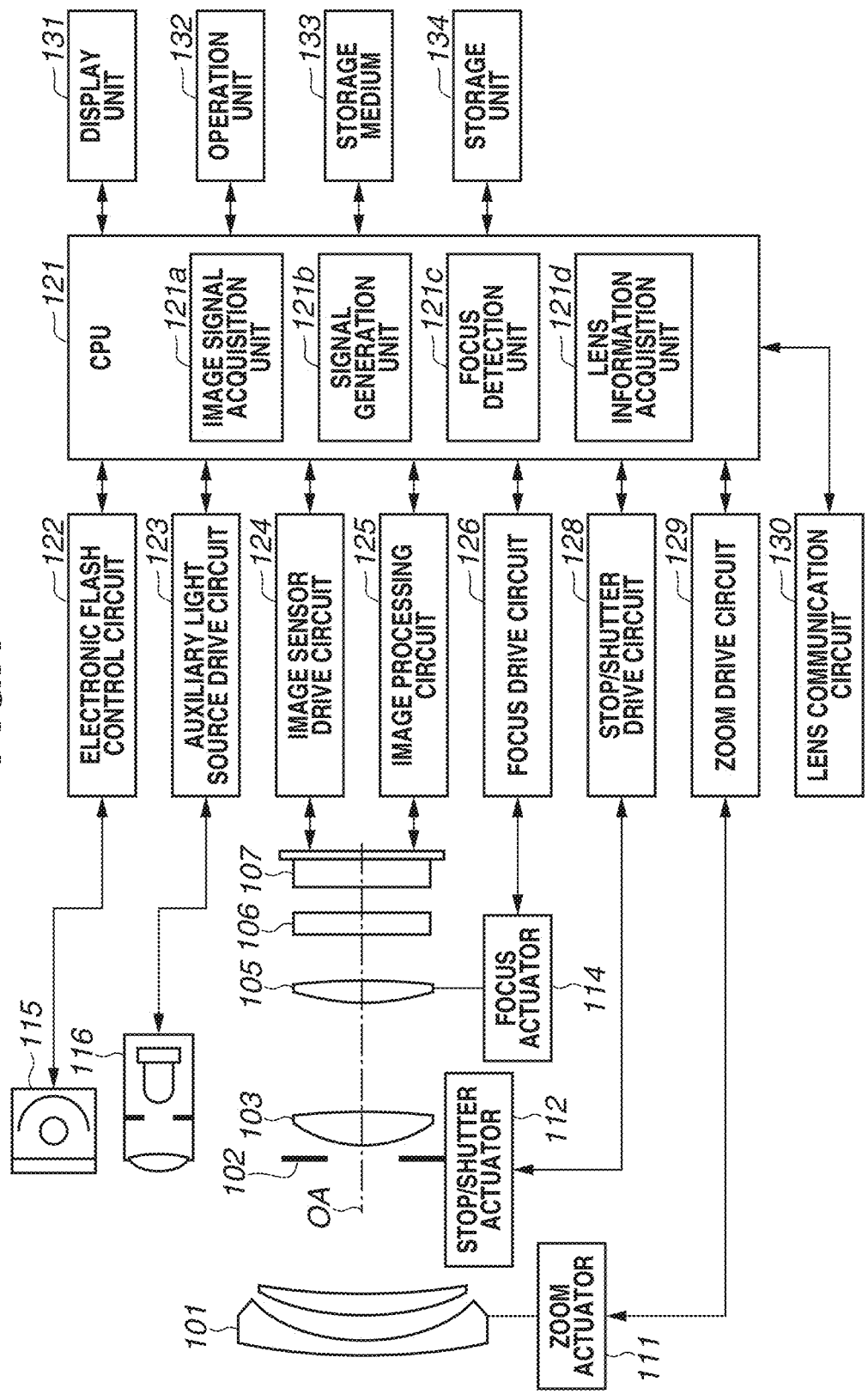
FIG. 1 is a block diagram illustrating a configuration of an image capturing apparatus including a focus detecting apparatus according to a first exemplary embodiment.

Exemplary embodiments of the disclosure will be described in detail below with reference to the accompanying drawings. In the drawings, the same members are denoted by the same reference numerals, and redundant descriptions are omitted.

The present exemplary embodiment illustrates a case where the disclosure is applied to an image capturing apparatus such as a digital camera. However, the disclosure can be widely applied to apparatuses other than the image capturing apparatus, such as a focus detecting apparatus, a distance detecting apparatus, an information processing apparatus, and an electronic apparatus.

[Overall Configuration]

FIG. 1 is a block diagram illustrating a configuration of an image capturing apparatus 100 including a focus detecting apparatus according to a first exemplary embodiment. The image capturing apparatus 100 is a digital camera system including a camera body and an exchangeable lens (an imaging optical system or an image capturing optical system) which is detachably attached to the camera body. However, the aspect of the embodiments is not limited to the configuration, but instead can be applied to an image capturing apparatus having a configuration in which a camera body and a lens are integrally formed.

The imaging optical system (image capturing optical system) generates an object image (optical image) of an object on a predetermined image forming plane. A first lens group 101 is disposed on a frontmost side (object side) of a plurality of lens groups constituting the imaging optical system, and is retractably held by a lens barrel along an optical axis OA. A stop/shutter (stop) 102 adjusts a light amount during image capturing by adjusting the opening diameter, and functions as a shutter for exposure time adjustment during still image capturing. A second lens group 103 advances and retracts along the optical axis OA integrally with the stop/shutter 102, and has a zoom function for performing a magnification operation in conjunction with an advancing/retracting operation of the first lens group 101. A third lens group 105 is a focus lens group that performs a focus adjustment (focusing operation) while advancing or retracting along the optical axis OA. An optical low-pass filter 106 is an optical element for reducing false color or moire of a captured image. Each lens group according to the present exemplary embodiment corresponds to a lens unit. In particular, the third lens group 105 corresponds to a lens unit capable of performing a focus adjustment.

An image sensor 107 is composed of, for example, a complementary metal-oxide semiconductor (CMOS) sensor or a charge-coupled device (CCD) sensor and peripheral circuits thereof, and performs a photoelectric conversion of an object image. As the image sensor 107, for example, a two-dimensional single-plate color sensor having a configuration in which a primary color mosaic filter of a Bayer array is formed in an on-chip manner on light-receiving pixels of m pixels in a horizontal direction and n pixels in a vertical direction is used. The image capturing optical system and the image sensor 107 constitute a single image capturing unit. However, the image sensor 107 is not limited to a single-plate type as described in the present exemplary embodiment, but instead may be, for example, a three-plate type. The image sensor 107 may include a plurality of image capturing units. That is, the aspect of the embodiments can be applied to any configuration, as long as the configuration includes an image capturing optical system that is compatible with the image sensor 107.

A zoom actuator 111 rotates a cam cylinder (not illustrated) to cause the first lens group 101 and the second lens group 103 to move along the optical axis OA during the magnification operation. In the case of adjusting the light amount (image capturing light amount), an stop/shutter actuator 112 adjusts the opening diameter of the stop/shutter 102. A focus actuator 114 causes the third lens group 105 to move along the optical axis OA during the focus adjustment. The stop and the shutter are not necessarily combined together, but instead may be separately provided.

An electronic flash 115 is an illumination apparatus used for illuminating an object. As the electronic flash 115, a flash illumination apparatus provided with a xenon tube, or an illumination apparatus provided with a light-emitting diode (LED) that consecutively emits light is used. An autofocus (AF) auxiliary light source 116 projects an image of a mask having a predetermined opening pattern onto the object through a projection lens. This enhances the focus detection capability for a dark object or a low-contrast object.

A central processing unit (CPU) 121 is a control device that performs various control operations for the image capturing apparatus 100. The CPU 121 includes a calculation unit, a read-only memory (ROM), a random access memory (RAM), an analog-to-digital (A/D) convertor, a digital-to-analog (D/A) convertor, and a communication interface circuit. The CPU 121 reads out and executes a predetermined program stored in the ROM or RAM to drive various circuits of the image capturing apparatus 100 and control a series of operations such as focus detection (AF), image capturing, image processing, and recording. Some of the functions of the CPU 121 may be implemented as hardware circuits, and a reconfigurable circuit, such as a field programmable gate array (FPGA), may be used as some of the circuits. For example, a dedicated hardware circuit may be used for a part of calculation for focus detection to be described below in order to reduce a time required for calculation.

The CPU 121 also includes a pixel signal acquisition unit 121a, a signal generation unit 121b, a focus detection unit 121c, and a lens information acquisition unit 121d. The communication interface circuit included in the CPU 121 may employ not only a method in which the communication interface circuit is connected to an external apparatus with a wired cable, such as a universal serial bus (USB) cable or a local area network (LAN) cable, but also a method in which the communication interface circuit is connected to an external apparatus by wireless communication using a wireless LAN, a mobile communication line, or the like. The connection to a communication partner is not limited to a connection method for directly connecting to a personal computer (PC) or a smartphone, but instead may be a connection method for connecting to a proximity or remote device via an access point or a network.

An electronic flash control circuit 122 controls lighting of the electronic flash 115 in synchronization with an image capturing operation. An auxiliary light source drive circuit 123 controls lighting of the AF auxiliary light source 116 in synchronization with focus detection processing. An image sensor drive circuit 124 controls the image capturing operation of the image sensor 107, performs an A/D conversion on an acquired image signal, and transmits the converted signal to the CPU 121. An image processing circuit 125 performs processing such as gamma conversion, color interpolation, or Joint Photographic Experts Group (JPEG) compression on image data output from the image sensor 107.

A focus drive circuit 126 drives the focus actuator 114 based on the focus detection result or the like of the focus detection unit 121c, and causes the third lens group 105 to move along the optical axis OA, thereby performing the focus adjustment. A stop/shutter drive circuit 128 drives the stop/shutter actuator 112 to control the opening diameter of the stop/shutter 102 and control an exposure time during still image capturing. A zoom drive circuit 129 drives the zoom actuator 111 based on a zoom operation performed by a photographer, and causes the first lens group 101 and the second lens group 103 to move along the optical axis OA, thereby performing the magnification operation.

A lens communication circuit 130 communicates with the exchangeable lens attached to the camera body, acquires lens information about the exchangeable lens, and sets various parameters. The acquired lens information is output to the lens information acquisition unit 121d of the CPU 121. In addition, image capturing information or the like detected by the camera body may be transmitted to the exchangeable lens. The exchangeable lens and the camera body are bayonet-coupled via a mount portion, and a plurality of terminals are in contact with each other in the coupled state. The exchangeable lens includes an electronic substrate including a CPU for a lens, a memory for a lens, and a gyroscope for a lens, which are not illustrated. The CPU for a lens uses parameters and the like stored in the memory for a lens and executes various programs. The memory for a lens stores information about an aberration, which is one of the optical characteristics of the lens, an exit pupil distance LPO, and the like, and is capable of transmitting the information together with a focus state FS and a zoom state ZS, which are optical conditions, to the camera body.

A display unit 131 includes, for example, a liquid crystal display device (LCD). The display unit 131 displays information about an image capturing mode of the image capturing apparatus 100, a preview image to be displayed before image capturing, an image for confirmation to be displayed after image capturing, an in-focus state display image during focus detection, or the like. An operation unit 132 includes a power supply switch, a release switch, a zoom operation switch, and an image capturing mode selection switch. The release switch includes a two-step switch having two states, i.e., a half-pressed state (a state where SW1 is ON) and a fully pressed state (a state where SW2 is ON). A storage medium 133 is, for example, a flash memory detachably attached to the image capturing apparatus 100, and records captured images (image data). A storage unit 134 stores captured images and the like in a predetermined format.

Some of the functions of the operation unit 132 may be provided on the display unit 131 in the form of a touch panel or the like. The focus detection can be performed on any position in an image by operating the touch panel while a preview image is displayed at the display unit 131.

A TVAF unit (not illustrated) may be provided to perform focus detection processing using a contrast detecting method based on a generated TVAF evaluation value (contrast information about image data). In the case of performing the focus detection processing using the contrast detecting method, the focus lens group 105 is moved and a lens position at which an evaluation value (focus evaluation value) indicates a peak is detected as an in-focus position.

Thus, the focus detection processing can be executed by combining an image capturing plane phase difference AF with TVAF, and the image capturing plane phase difference AF and TVAF can be used selectively or in combination depending on the situation. Each block functions as a control unit that controls the position of the focus lens group 105 by using the focus detection results of each block.

[Image Sensor]

Figure 2:
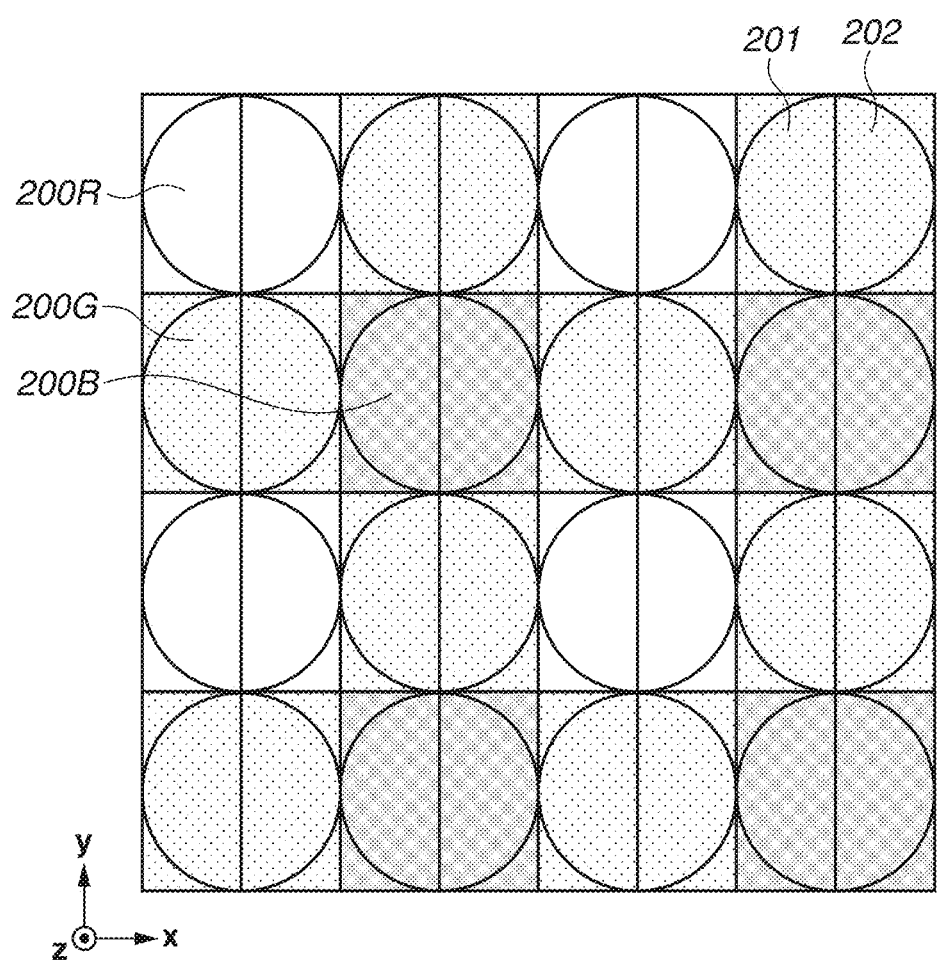
FIG. 2 illustrates a pixel array according to the first exemplary embodiment.

Referring first to FIG. 2 and FIGS. 3A and 3B, a pixel array and a pixel structure of the image sensor 107 according to the present exemplary embodiment will be described. FIG. 2 illustrates an array of pixels (image capturing pixels) of the image sensor 107. FIGS. 3A and 3B each illustrate a pixel structure of the image sensor 107. FIG. 3A is a plan view (viewed along a+z direction) of a pixel 200G of the image sensor 107. FIG. 3B is a sectional view (viewed along a-y direction) taken along a line a-a in FIG. 3A.

FIG. 2 illustrates the pixel array of the image sensor 107 in a range of four rows×four columns. According to the present exemplary embodiment, in a pixel group 200 of two rows×two columns, pixels 200R, 200G, and 200B are arranged in a Bayer array. Specifically, in the pixel group 200, the pixel 200R having spectral sensitivity of red (R) is located at an upper left position, the pixels 200G each having spectral sensitivity of green (G) are located at upper right and lower left positions, and the pixel 200B having spectral sensitivity of blue (B) is located at a lower right position. The pixels 200R, 200G, and 200B are each composed of a focus detection pixel (first focus detection pixel) 201 and a focus detection pixel (second focus detection pixel) 202, which are arranged in an array of two rows×one column. Accordingly, FIG. 2 illustrates the array of focus detection pixels in a range of eight rows×four columns. The pixels according to the present exemplary embodiment are composed of two focus detection pixels arranged in an x-direction. However, the configuration of the pixels according to the present exemplary embodiment is not limited to the configuration, and the two focus detection pixels may be arranged in a y-direction. The pixels may be composed of two or more focus detection pixels, or may be composed of a combination of several types of configurations.

As illustrated in FIG. 2, the image sensor 107 is configured in such a manner that a large number of pixels of four rows×four columns (focus detection pixels of eight rows× four columns) are arranged on a plane, and outputs image capturing signals (focus detection signals). In the image sensor 107 according to the present exemplary embodiment, a period P of pixels is 6 μm and the number N of pixels is horizontally 6,000 columns×vertically 4,000 rows=24 million pixels. In the image sensor 107, a period $P_{SUB}$ of focus detection pixels in a column direction is 3 μm, and the number $N_{SUB}$ of focus detection pixels is horizontally 12,000 columns×vertically 4,000 rows=48 million pixels. When the image sensor 107 is used to acquire a moving image or the like in 4K format, the image sensor 107 may include pixels of horizontally 4,000 columns or more. In the case of acquiring an image in a format with a size greater than the above-described size, the image sensor 107 may include a number of pixels corresponding to the format.

As illustrated in FIG. 3B, the pixel 200G according to the present exemplary embodiment is provided with microlenses 305 for condensing the incident light to the light-receiving surface of the pixel which corresponds to an interface of semiconductor, such as silicon, in which a photodiode is formed. The plurality of microlenses 305 is two-dimensionally arrayed and is disposed at a position away from the light-receiving surface by a predetermined distance in a z-axis direction (direction of the optical axis OA). In the pixel 200G, a photoelectric conversion unit 301 and a photoelectric conversion unit 302 are formed by dividing the pixel into Nx (two divisions) in the x-direction and into Ny (one division) in the y-direction (division number $N_{LF}$=Nx×Ny (division number of 2). The photoelectric conversion unit 301 and the photoelectric conversion unit 302 correspond to the focus detection pixel 201 and the focus detection pixel 202, respectively.

The photoelectric conversion unit 301 and the photoelectric conversion unit 302 are formed on a semiconductor substrate, such as silicon, and are each formed of a pn-junction photodiode including a p-type layer and an n-type layer. If necessary, the photoelectric conversion unit 301 and the photoelectric conversion unit 302 may be configured as a pin-structure photodiode having a configuration in which an intrinsic layer is formed between a p-type layer and an n-type layer. Each pixel 200G (each pixel) is provided with a color filter 306 that is formed between the microlens 305 and each of the photoelectric conversion unit 301 and the photoelectric conversion unit 302. If necessary, the spectral transmittance of the color filter 306 can be changed for each pixel or each photoelectric conversion unit. Alternatively, the color filter 306 may be omitted.

The light incident on the pixel 200G is condensed by the microlens 305 and is dispersed by the color filter 306, and then the dispersed light is received by the photoelectric conversion units 301 and 302. In each of the photoelectric conversion units 301 and 302, pairs of an electron and a hole are generated depending on a light receiving amount and the pairs are separated in a depletion layer, and then the electrons with a negative charge are accumulated in the n-type layer. On the other hand, the holes are discharged to the outside of the image sensor 107 through the p-type layer connected to a constant voltage source (not illustrated). The electrons accumulated in the n-type layers of the photoelectric conversion units 301 and 302 are transferred to an electrostatic capacitance unit (FD) through a transfer gate and is converted into a voltage signal.

In the present exemplary embodiment, each microlens 305 corresponds to an optical system in the image sensor 107. The optical system may include a plurality of microlenses, or may be a structure using materials with different refractive indices, such as a waveguide. Alternatively, the image sensor 107 may be a back-side-illuminated image sensor including a circuit and the like on a surface opposite to the surface on which the microlens 305 is formed. More alternatively, the image sensor 107 may be a stacked image sensor including some circuits such as the image sensor drive circuit 124 and the image processing circuit 125. As the semiconductor substrate, a material other than silicon may be used. For example, an organic material may be used as a photoelectric conversion material.

[Pupil Division]

Next, the pupil division function of the image sensor 107 according to the present exemplary embodiment will be described with reference to FIGS. 4 to 8.

Figure 4:
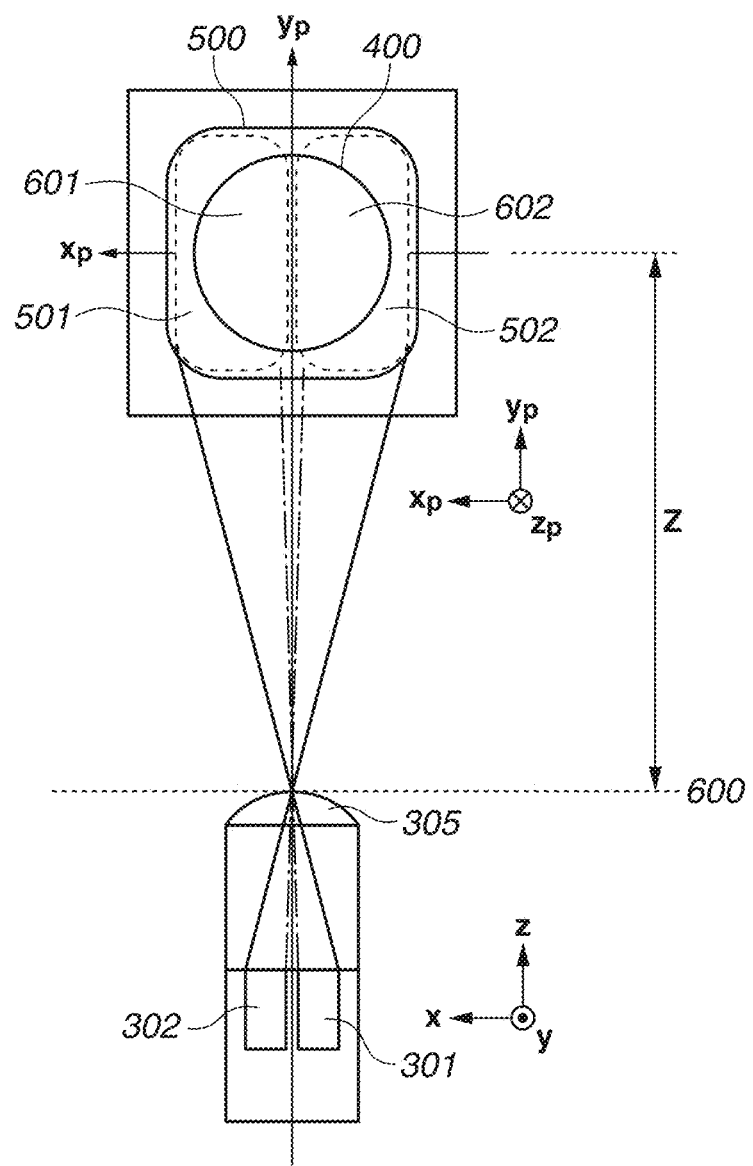
FIG. 4 illustrates a correspondence between a pixel of an image sensor and a pupil intensity distribution according to the first exemplary embodiment.

FIG. 4 is a sectional view taken along the line a-a of the pixel 200G in the pixel array of the image sensor 107 according to the present exemplary embodiment illustrated in FIG. 3A as viewed along the +y direction. FIG. 4 also illustrates a pupil plane at a position away from an image capturing plane 600 of the image sensor 107 by a distance Z in the z-axis direction (direction of the optical axis OA). In FIG. 4, in order to correspond to a coordinate axis of an exit pupil plane, an x-axis and a y-axis in the sectional view are inverted with respect to the x-axis and y-axis illustrated in FIGS. 3A and 3B. The image capturing plane 600 of the image sensor 107 is disposed on the image forming plane of the imaging optical system.

A pupil intensity distribution (first pupil intensity distribution) 501 has an approximately conjugate relationship, via the microlens 305, with the light-receiving surface of the photoelectric conversion unit 301 whose centroid position is displaced in the −x-direction. Accordingly, the first pupil intensity distribution 501 corresponds to a pupil area in which light can be received by the focus detection pixel 201. The centroid position of the first pupil intensity distribution 501 is displaced to the +xp side on the pupil plane. Similarly, a pupil intensity distribution (second pupil intensity distribution) 502 has an approximately conjugate relationship, via the microlens 305, with the light-receiving surface of the photoelectric conversion unit 302 whose centroid position is displaced in the +x-direction. Accordingly, the second pupil intensity distribution 502 corresponds to a pupil area in which light can be received by the focus detection pixel 202. The centroid position of the second pupil intensity distribution 502 is displaced to the −xp side on the pupil plane. A pupil intensity distribution 500 corresponds to a pupil area in which light can be received by the whole pixel 200G when all the photoelectric conversion units 301 and 302 (focus detection pixels 201 and 202) are combined. In other words, the first pupil intensity distribution 501 is displaced to the +xp side on the pupil plane with respect to the center of the pupil intensity distribution 500, and the second pupil intensity distribution 502 is displaced to the −xp side on the pupil plane with respect to the center of the pupil intensity distribution 500.

Figure 5:
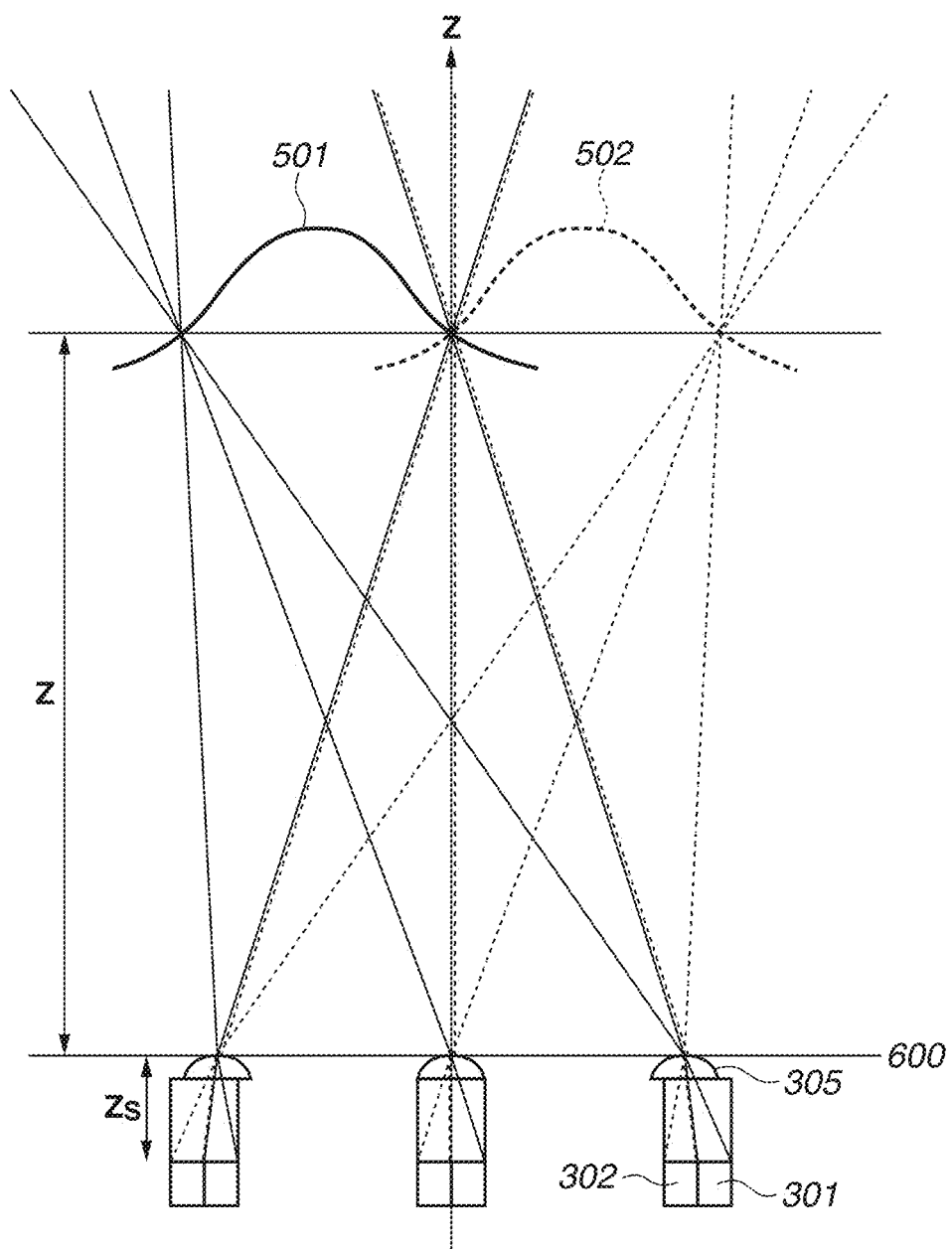
FIG. 5 illustrates a correspondence between the image sensor and the pupil intensity distribution according to the first exemplary embodiment.

Next, a sensor incident pupil of the image sensor 107 will be described with reference to FIG. 5. In the image sensor 107 according to the present exemplary embodiment, each microlens 305 is disposed by being continuously shifted toward the center of the image sensor 107 depending on image height coordinates for each pixel located at image height coordinates on a two-dimensional plane. In other words, each microlens 305 is disposed in such a manner that the microlens 305 is displaced toward the center of the photoelectric conversion units 301 and 302 as the image height increases. The center of the image sensor 107 and the optical axis of the image capturing optical system vary depending on a mechanism for reducing effects of blurring due to hand shake or the like by driving the image capturing optical system or the image sensor 107, but the center of the image sensor 107 and the optical axis of the image capturing optical system substantially match. Thus, on the pupil plane at a position away from the image sensor 107 by the distance Z, the first pupil intensity distributions 501 corresponding to the photoelectric conversion units of the first focus detection pixels 201 of each pixel located at image height coordinates of the image sensor 107 are configured to substantially match. Similarly, the second pupil intensity distributions 502 corresponding to the photoelectric conversion units of the second focus detection pixels 202 are configured to substantially match. In other words, on the pupil plane at the position away from the image sensor 107 by the distance Z, the first pupil intensity distributions 501 of all the pixels of the image sensor 107 are configured to substantially match and the second pupil intensity distributions 502 of all the pixels of the image sensor 107 are also configured to substantially match. Hereinafter, the first pupil intensity distribution 501 and the second pupil intensity distribution 502 are each referred to as the "sensor incident pupil" of the image sensor 107, and the distance Z is referred to as the "incident pupil distance" of the image sensor 107. Not all the pixels are to be configured to have a single incident pupil distance. For example, the pixels may be configured in such a manner that the incident pupil distances of pixels up to 80% of the image height substantially match, or the pixels may have different incident pupil distances for each row or each detection area.

Figure 6:
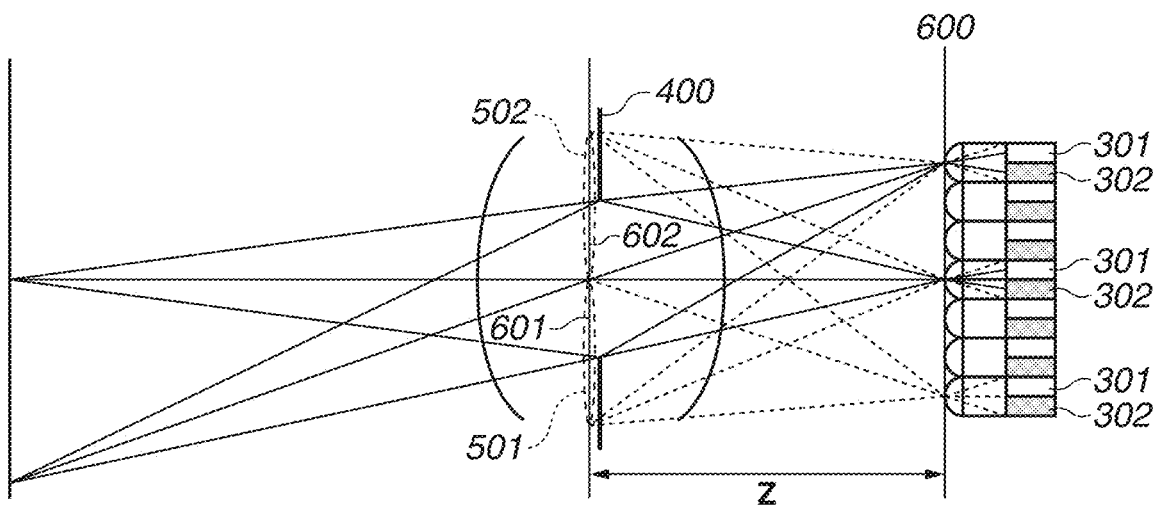
FIG. 6 illustrates pupil division in an imaging optical system and the image sensor according to the first exemplary embodiment.

FIG. 6 illustrates an optical division (pupil division) of an exit pupil 400 of the imaging optical system by the sensor incident pupil (the first pupil intensity distribution 501 and the second pupil intensity distribution 502) of the image sensor 107 according to the present exemplary embodiment. In the light beams from the object, the light beam which has passed through a pupil partial area (first pupil partial area) 601, which is an overlapping area between the exit pupil 400 of the imaging optical system and the pupil intensity distribution 501, is received by the focus detection pixel 201 (photoelectric conversion unit 301). Similarly, in the light beams from the object, the light beam which has passed through a pupil partial area (second pupil partial area) 602, which is an overlapping area between the exit pupil 400 of the imaging optical system and the pupil intensity distribution 502, is received by the focus detection pixel 202 (photoelectric conversion unit 302).

FIG. 4 illustrates the first pupil partial area 601 and the second pupil partial area 602 on the pupil plane at the position away from the image capturing plane by the incident pupil distance Z of the image sensor 107. The exit pupil 400 of the imaging optical system is divided into the first pupil partial area 601 and the second pupil partial area 602 by the sensor incident pupil (the first pupil intensity distribution 501 and the second pupil intensity distribution 502) of the image sensor 107. In other words, the common area (product) between each of the first pupil intensity distribution 501 and the second pupil intensity distribution 502 and the exit pupil 400 of the imaging optical system becomes the first pupil partial area 601 and the second pupil partial area 602.

Figure 7A:
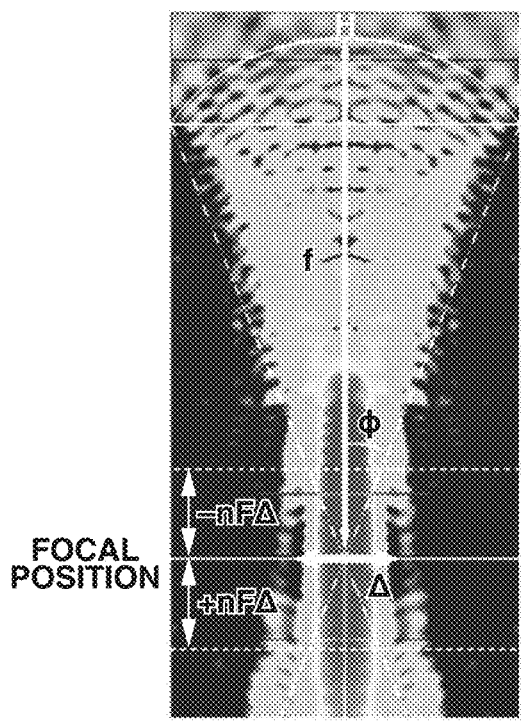
FIGS. 7A and 7B are sectional views each illustrating a light intensity distribution when light is incident on a microlens formed in each pixel according to the first exemplary embodiment.
Figure 7B:
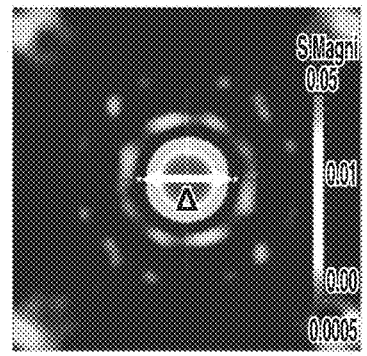

FIGS. 7A and 7B each illustrate a light intensity distribution when light is incident on the microlens 305 formed on each pixel. FIGS. 7A and 7B also illustrate an example of calculating a light intensity distribution in the image sensor 107 in a case where a wavelength $\lambda=540$ nm and a plane wave of right circular polarization is incident from above the microlens 305 in parallel to the optical axis of the microlens 305. A finite difference time domain (FDTD) method is used for numerical calculation.

FIG. 7A illustrates a light intensity distribution at a section parallel to the optical axis of the microlens 305. A microlens optical system in each pixel is composed of the microlens 305, a planarizing layer, a sealing layer, an insulating layer, and the like. The microlens optical system may include a plurality of microlenses. Assume that a pixel period is represented by 2a, a focal length of the microlens optical system is represented by f, and an opening angle of the microlens optical system is represented by $2\varphi$. Also, assume that a refractive index at the focus position of the microlens optical system is represented by n, and a coordinate along the optical axis is represented by z. With respect to the coordinate z, the microlens side is represented by a negative sign and the side opposite to the microlens is represented by a positive sign relative to a focus position as an origin (z=0). In addition, H represents a principal point.

A numerical aperture NA of the microlens optical system is defined by the following equation (1).

$$NA = n \sin \varphi \quad (1)$$

An aperture value F of the microlens optical system is defined by the following equation (2).

$$F = \frac{1}{2n\sin\varphi} = \frac{f}{2na} \quad (2)$$

Incident light is condensed at a focus position by the microlens optical system. However, the diameter of a light condensing spot cannot be made smaller than a diffraction limit $\Delta$ due to the effect of diffraction by light wave nature, and thus the light condensing spot has a finite size. The diffraction limit $\Delta$ can be substantially obtained by the following equation (3) assuming that the intensity distribution of the light condensing spot is close to an airy pattern and the wavelength of incident light is represented by $\lambda$.

$$\Delta = 1.22 \frac{\lambda}{n\sin\varphi} = 2.44\lambda F \quad (3)$$

The size of the light-receiving surface of the photoelectric conversion unit is about 1 to 3 µm, while the size of the light condensing spot of the microlens 305 is about 1 µm. Accordingly, the sensor incident pupil (the first pupil intensity distribution 501 and the second pupil intensity distribution 502) illustrated in FIGS. 4 to 6, which has a conjugate relationship, via the microlens 305, with the light-receiving surface of the photoelectric conversion unit, is not clearly divided due to a diffraction blur, so that a light receiving rate distribution (pupil intensity distribution) depending on a light incident angle is obtained.

FIG. 7B illustrates a light intensity distribution at a section vertical to the optical axis of the microlens 305 at the focus position of the microlens 305. At a point position (z=0), the diameter of the light condensing spot is the diffraction limit $\Delta$ and thus is minimum.

A rear-side focal depth $+z_D$ and a front-side focal depth $-z_D$ of the microlens optical system can be obtained by the following equation (4) when the diffraction limit $\Delta$ is defined as a permissible circle of confusion. The focal depth has a range of $-z_D < z < +z_D$.

$$\pm z_D = \pm nF\Delta \quad (4)$$

Assuming that the intensity distribution of the light condensing spot is close to a Gaussian distribution, a diameter w of the light condensing spot substantially satisfies the relationship represented by the following equation (5) as a function of the coordinate z.

$$w(z) = \Delta \sqrt{1 + \left(\frac{z}{z_R}\right)^2} \quad (5)$$

In the equation (5), $z_R$ represents the Rayleigh length and is defined as $z_R = \alpha_R z_D$, where the coefficient $\alpha_R = 0.61 \pi \approx 1.92$.

In calculation examples illustrated in FIGS. 7A and 7B, the wavelength $\lambda=540$ nm, the pixel period $2a=4.3$ µm, the focal length f of the microlens optical system=5.8 µm, and the refractive index n at the focus position=1.46. In addition, the aperture value F of the microlens optical system=0.924, the diffraction limit Δ=1.22 µm, and the focal depth $z_D$=1.65 µm.

Figure 8:
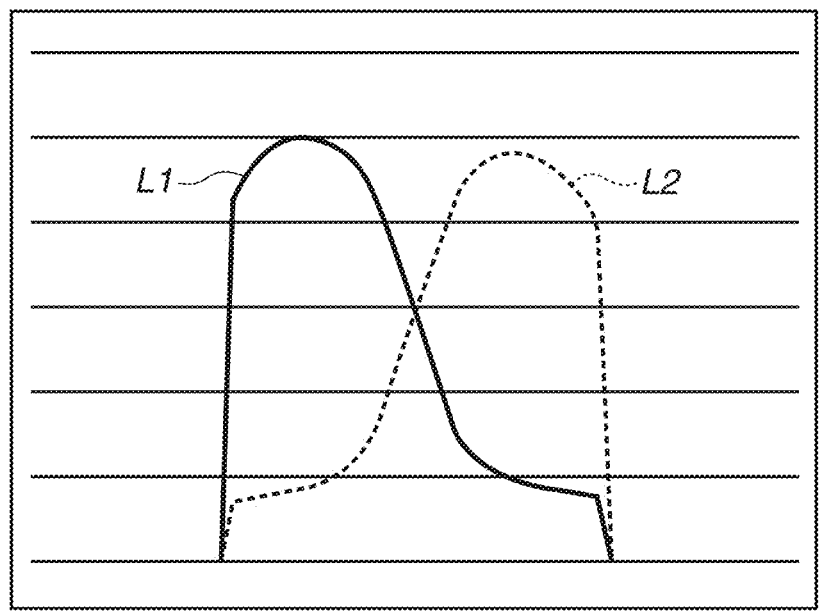
FIG. 8 illustrates pupil partial areas according to the first exemplary embodiment.

FIG. 8 illustrates examples of the first pupil partial area 601 and the second pupil partial area 602 according to the present exemplary embodiment. A horizontal axis represents a light incident angle θ (which can be converted into pupil coordinates), and a vertical axis represents a light receiving rate. A graph line L1 indicated by a solid line in FIG. 8 represents the light receiving rate distribution along the x-axis of the first pupil partial area 601 illustrated in FIG. 4, and a graph line L2 indicated by a dotted line represents the light receiving rate distribution along the x-axis of the second pupil partial area 602. As illustrated in FIG. 8, on the outside of each of the first pupil partial area L1 and the second pupil partial area L2, vignetting is caused by the exit pupil defined by lens frames and diaphragm frames of the imaging optical system, so that the light receiving rate distribution becomes a steep curve. On the inside of each of the first pupil partial area L1 and the second pupil partial area L2, the boundary of the pupil partial area is blurred by the influence of diffraction due to the pupil division by the microlens 305, so that the light receiving rate distribution becomes a gentle curve. The present exemplary embodiment illustrates an example in which the pupil area is divided into two areas in the horizontal direction. If necessary, the pupil division may be performed in the vertical direction.

In the present exemplary embodiment, the image sensor 107 includes a plurality of focus detection pixels that share a single microlens 305 and receive a plurality of light beams which pass through different areas of the pupil of the imaging optical system (image capturing lens). The image sensor 107 includes, as the plurality of focus detection pixels, first focus detection pixels (a plurality of focus detection pixels 201) and second focus detection pixels (a plurality of focus detection pixels 202). Further, the image sensor 107 may include an array of pixels that receive a light beam which passes through the combined area of the pupil partial areas 601 and 602 of the imaging optical system. In the image sensor 107, the pixels are composed of the first and second focus detection pixels. However, if necessary, the image capturing pixels and the first and second focus detection pixels may be separately formed, and the first and second focus detection pixels may be disposed in a part of the image capturing pixel array.

In the present exemplary embodiment, the focus detection is performed by generating first focus detection signals based on pixel signals from the focus detection pixels 201 of the pixels of the image sensor 107, and by generating second focus detection signals based on pixel signals from the focus detection pixels 202 of the pixels of the image sensor 107. Further, the signals from the focus detection pixels 201 and 202 are added and read out for each pixel of the image sensor 107, thereby making it possible to generate an image capturing signal (captured image) having a resolution corresponding to the effective pixel number N. The method of generating each signal is not limited to the method described in the present exemplary embodiment. For example, the second focus detection signal may be generated based on the difference between the image capturing signal and the first focus detection signal.

As the pixel configuration of the image sensor 107, the photoelectric conversion unit 301 and the photoelectric conversion unit 302 are provided for each microlens 305, but the pixel configuration of the image sensor 107 is not limited to the configuration. For example, the pupil division may be performed using a configuration in which a light-shielding layer partially including an opening is formed between the microlens 305 and the photoelectric conversion unit. The opening position in the light-shielding layer is varied in adjacent pixels, thereby making it possible to acquire signals corresponding to the photoelectric conversion unit 301 and the photoelectric conversion unit 302.

[Relationship Between a Defocus Amount and an Image Deviation Amount]

Figure 9:
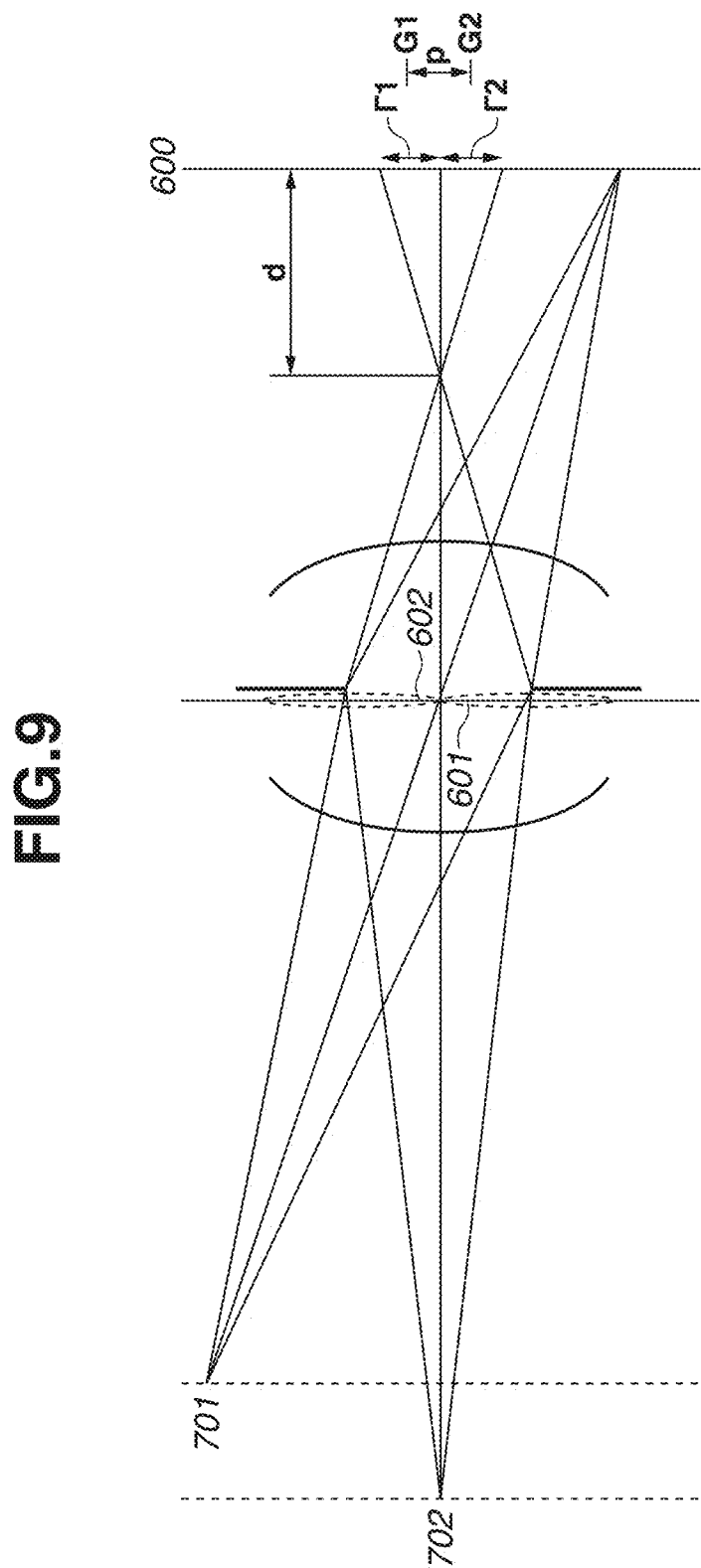
FIG. 9 is a relationship diagram illustrating a relationship between a defocus amount and an image deviation amount according to the first exemplary embodiment.

Referring to FIG. 9, a relationship between a defocus amount and an image deviation amount of the first focus detection signal acquired from the focus detection pixels 201 of the image sensor 107 and the second focus detection signal acquired from the focus detection pixels 202 of the image sensor 107 will be described. FIG. 9 is a relationship diagram illustrating the relationship between the defocus amount and the image deviation amount. FIG. 9 illustrates a state where the image sensor 107 is disposed on the image capturing plane 600, and the exit pupil 400 of the imaging optical system is divided into two areas, i.e., the pupil partial areas 601 and 602, as in FIGS. 4 and 6.

A defocus amount d illustrated in FIG. 9 is defined such that a distance from an image forming position of an object image to the image capturing plane 600 is |d|. Further, a front focus state in which the image forming position is located closer to the object image than the image capturing plane 600 is defined as a negative sign (d<0), and a rear focus state in which the image forming position is located at a side opposite to the object image relative to the image capturing plane 600 is defined as a positive sign (d>0). In an in-focus state in which the image forming position of the object is on the image capturing plane 600 (in-focus position), the defocus amount d=0 is satisfied. FIG. 9 illustrates an object 701 in the in-focus state (d=0) and an object 702 in the front focus state (d<0). The front focus state (d<0) and the rear focus state (d>0) are collectively referred to as a defocus state (|d|>0).

In the front focus state (d<0), the light beam that has passed through the first pupil partial area 601 (or the second pupil partial area 602) in the light beams from the object 702 is condensed once. After that, the light beam spreads to a width Γ1 (Γ2) around a centroid position G1 (G2) of the light beam, and a blurred image is formed on the image capturing plane 600. The blurred image is received by the focus detection pixels 201 (focus detection pixels 202) constituting each pixel arrayed in the image sensor 107, and the first focus detection signal (second focus detection signal) is generated. Therefore, the first focus detection signal (second focus detection signal) is recorded as a blurred object image in which the object 702 is blurred with the width Γ1 (Γ2) at the centroid position G1 (G2) on the image capturing plane 600. The blurred width Γ1 (Γ2) of the object image increases approximately in proportion as the size |d| of the defocus amount d increases. Similarly, a size |p| of an image deviation amount p of the object image between the first focus detection signal and the second focus detection signal (i.e. which is equivalent to a difference of the centroid positions of the light beams (G1-G2)) increases approximately in proportion as the size |d| of the defocus amount d increases. This also applies to the rear focus state (d>0), but an image deviation direction of the object image between the first focus detection signal and the second focus detection signal is opposite to that in the front focus state.

As described above, in the present exemplary embodiment, the size of the image deviation amount between the first focus detection signal and the second focus detection signal increases as the size of the defocus amount of the first focus detection signal and the second focus detection signal or of the image capturing signal obtained by adding the first focus detection signal and the second focus detection signal increases.

In the present exemplary embodiment, the focus adjustment based on a phase different detecting method is performed using the relationship between the defocus amount and the image deviation amount of the first focus detection signal and the second focus detection signal. In the focus adjustment based on the phase difference detecting method, a correlation amount representing a degree of matching between signals is calculated by shifting the first focus detection signal and the second focus detection signal relatively to each other, and an image deviation amount is detected from a shift amount where the correlation (degree of matching between signals) improves. As the size of the defocus amount of the image capturing signal increases, the size of the image deviation amount between the first focus detection signal and the second focus detection signal increases, and based on this relationship, the image deviation amount is converted into a defocus amount, thereby performing the focus detection based on the phase difference detecting method.

As described above, the exit pupil 400 of the imaging optical system is divided into the areas, i.e., the first pupil partial area 601 and the second pupil partial area 602, by the first pupil intensity distribution 501 and the second pupil intensity distribution 502 in the image sensor 107, thereby performing the focus detection based on the phase difference detecting method. More specifically, the pupil partial areas (the first pupil partial area 601 and the second pupil partial area 602) according to the present exemplary embodiment are determined by the pupil eccentric amount of the sensor incident pupil and the incident pupil distance of the image sensor 107 and lens frame vignetting in the imaging optical system, so that a more complicated shape as described below is obtained.

Figure 10:
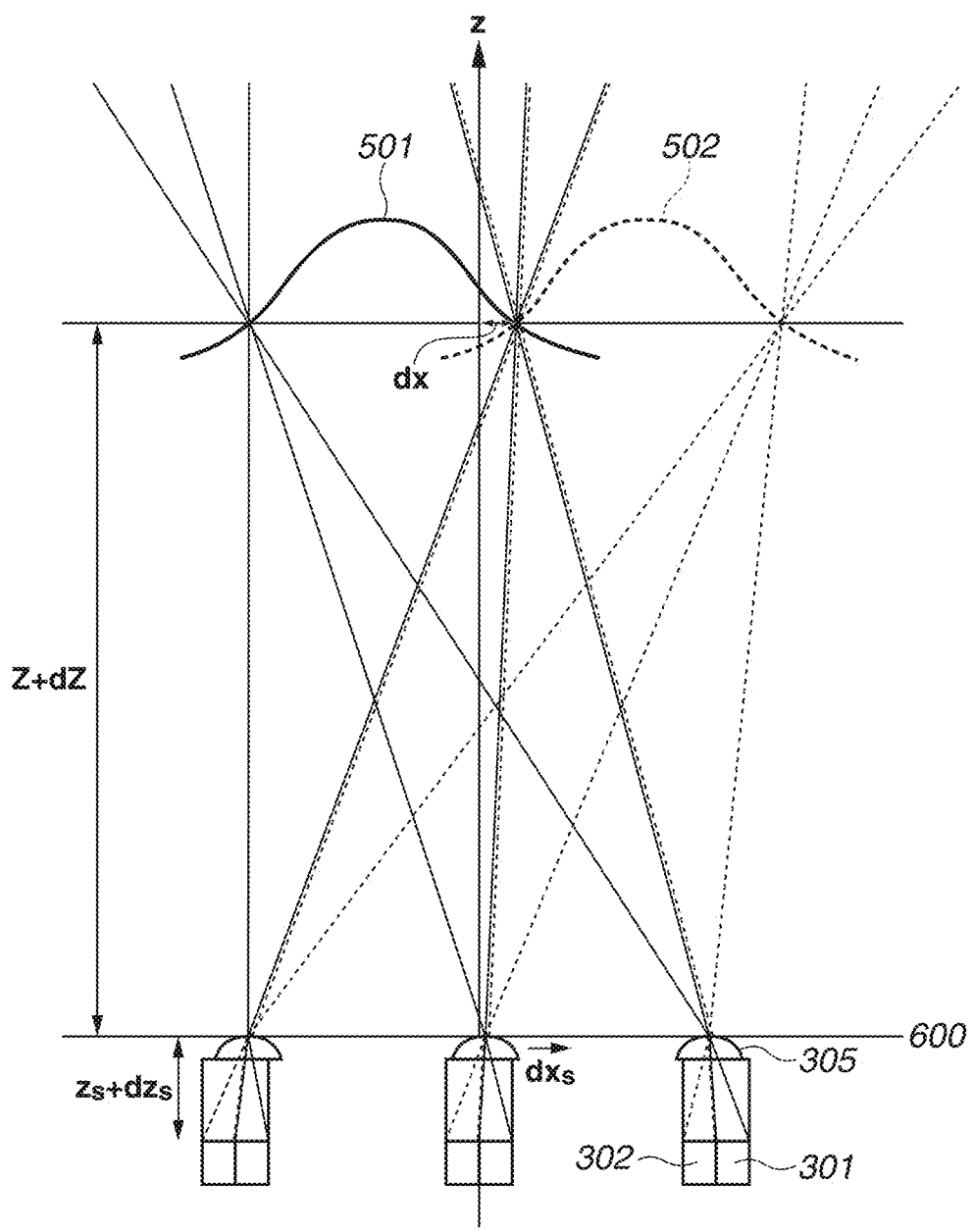
FIG. 10 illustrates a correspondence between the image sensor and the pupil intensity distribution when pupil eccentricity or a variation in incident pupil distance occurs according to the first exemplary embodiment.
Figure 11:
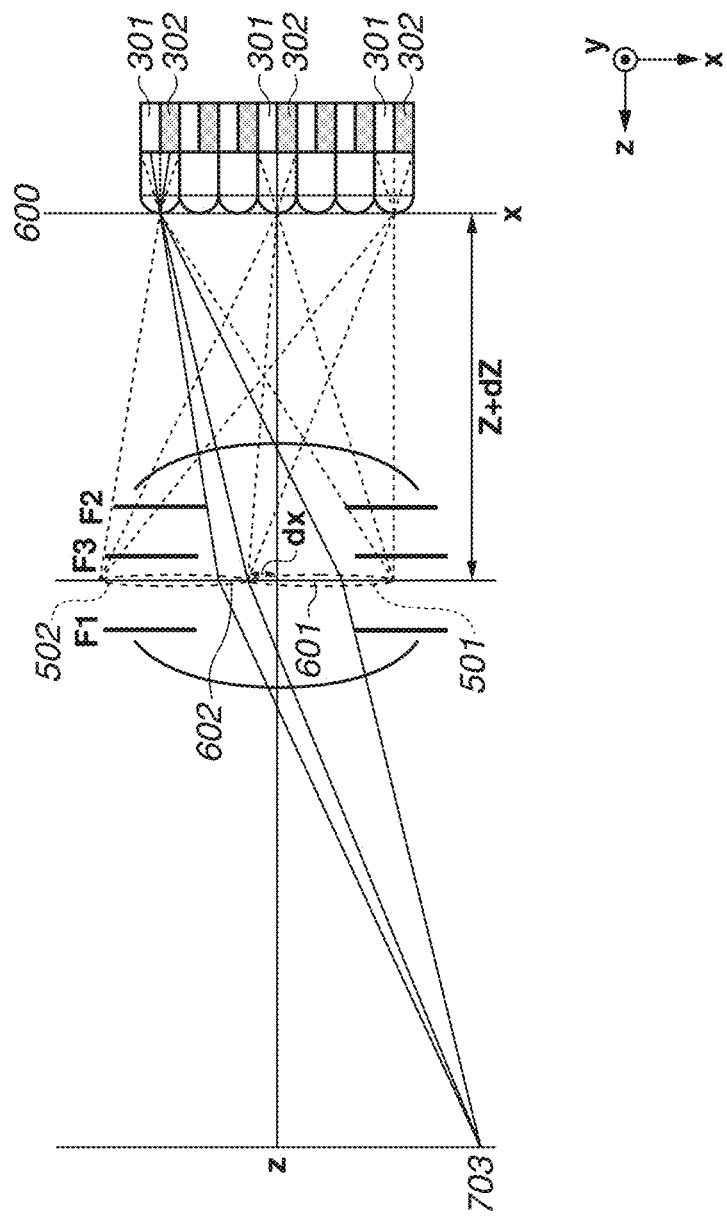
FIG. 11 is a relationship diagram illustrating relationships among a sensor incident pupil, a pupil eccentric amount, and an incident pupil distance of the image sensor, lens frame vignetting in the imaging optical system, and pupil partial areas according to the first exemplary embodiment.
Figure 12:
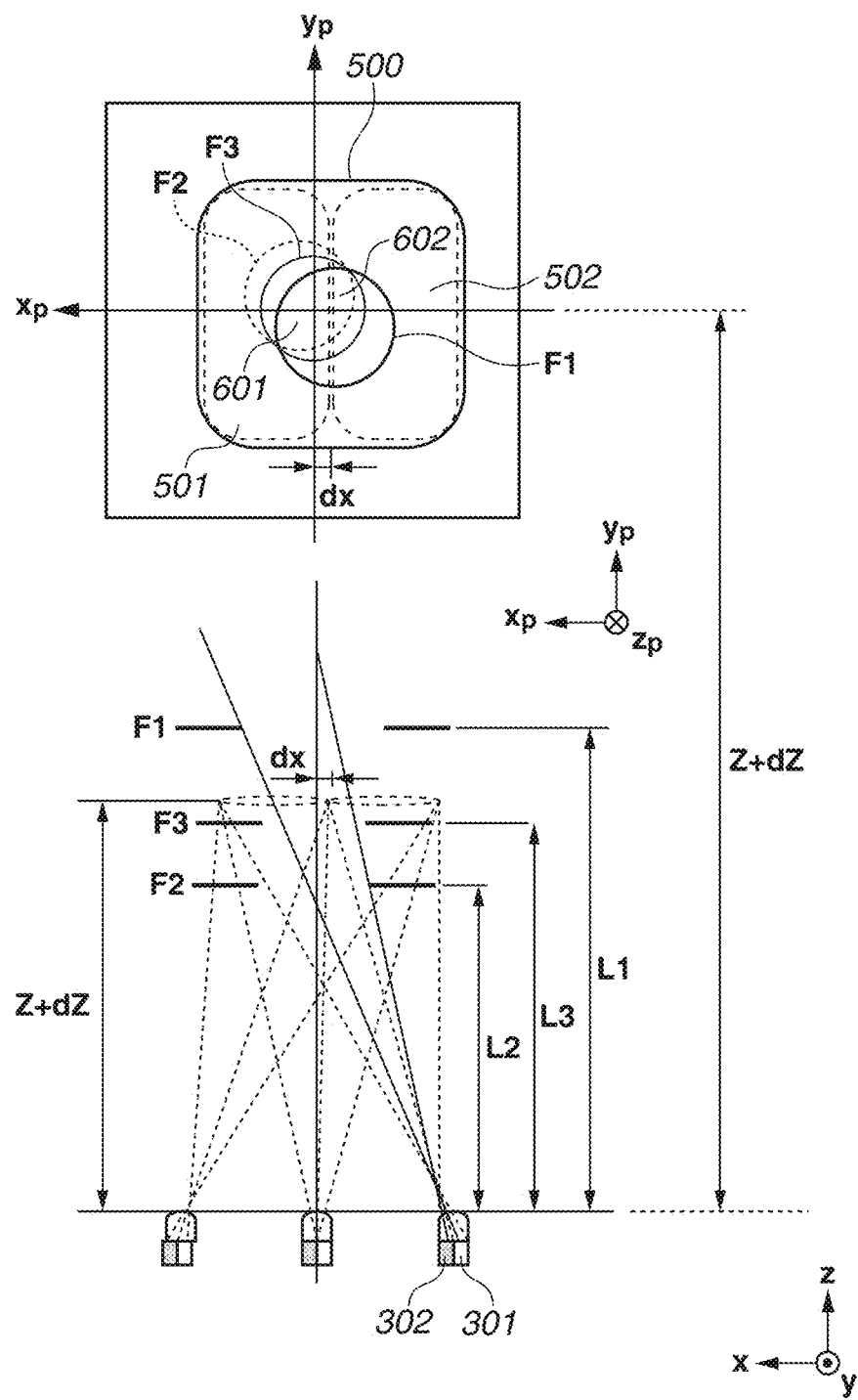
FIG. 12 is a relationship diagram illustrating relationships among the sensor incident pupil, the pupil eccentric amount, and the incident pupil distance of the image sensor, lens frame vignetting in the imaging optical system, and pupil partial areas according to the first exemplary embodiment.

Referring next to FIGS. 10 to 12, relationships among the pupil eccentric amount of the sensor incident pupil and the incident pupil distance of the image sensor 107, lens frame vignetting in the imaging optical system, and the pupil partial areas (the first pupil partial area 601 and the second pupil partial area 602) according to the present exemplary embodiment will be described.

[Pupil Eccentricity of Sensor Incident Pupil]

With respect to the sensor incident pupil (pupil intensity distributions 501 and 502) of the image sensor 107 according to the present exemplary embodiment, pupil eccentricity (eccentricity of the pupil intensity distribution with respect to the optical axis) or a variation in incident pupil distance may occur due to variations or the like during production. FIG. 10 illustrates an example in which the distance from each microlens 305 to the light-receiving surface of each of the photoelectric conversion units 301 and 302 in all the pixels of the image sensor 107 is represented by a distance $z_s+dz_s$ with respect to a design value $z_s$ due to an error in fabrication or the like (error+$dz_s$). Accordingly, an example is illustrated in which the incident pupil distance of the image sensor 107 is represented by an incident pupil distance Z+dZ (error+dZ) with respect to a design value Z. In addition, an example is illustrated in which the microlenses 305 in all the pixels of the image sensor 107 are configured to be decentered (eccentric amount $dx_s$) relative to the photoelectric conversion units 301 and 302 in the pupil division direction (the direction of division of the photoelectric conversion units 301 and 302) with respect to design values due to an error during fabrication or the like. Accordingly, an example is illustrated in which the incident pupil (pupil intensity distributions 501 and 502) of the image sensor 107 is configured to be decentered (pupil eccentric amount dx) in the pupil division direction (direction of division of the photoelectric conversion units 301 and 302). The above-described cases may occur due to an assembly error or the like when the image sensor 107 is disposed in the image capturing apparatus 100. Although the present exemplary embodiment is described assuming that the amount of error in each axis direction is constant, the amount of error is not limited to this. Different amounts of error may be included in the plane. For example, when an error occurs within the plane in a rotation direction, the amount of error varies depending on the distance to the rotation axis. Also, when an inclination is generated, the amount of error varies depending on the distance.

[Lens Frame Vignetting]

Referring next to FIGS. 11 and 12, lens frame vignetting of light beams from an object at a peripheral image height of the image sensor 107 according to the present exemplary embodiment will be described. FIG. 11 illustrates relationships among the pupil eccentric amount of the sensor incident pupil and the incident pupil distance at a peripheral image height of the image sensor 107, lens frame vignetting in the imaging optical system, and the pupil partial areas (the first pupil partial area 601 and the second pupil partial area 602) on an xz plane from the +y side. FIG. 11 illustrates an example in which the incident pupil (pupil intensity distributions 501 and 502) of the image sensor 107 corresponds to that illustrated in FIG. 10 and is decentered (pupil eccentric amount dX) in the pupil division direction (direction of division of the photoelectric conversion units 301 and 302) on the pupil plane at the incident pupil distance Z+dZ.

Vignetting is sequentially caused in the light beams from an object 703 by an object-side first frame (object-side frame) F1 of the imaging optical system, a third frame (diaphragm frame) F3, which is a diaphragm frame of the imaging optical system, and an image-side second frame (image-side frame) F2 of the imaging optical system, and the light beams reach the image forming plane 600. In the light beams in which vignetting is caused by the first to third frames of the imaging optical system, the light beam which has passed through the first pupil partial area 601, which is an overlapping area with the pupil intensity distribution 501, is received by the focus detection pixel 201 (photoelectric conversion unit 301). Similarly, in the light beams in which vignetting is caused by the first to third frames of the imaging optical system, the light beam which has passed through the second pupil partial area 602, which is an overlapping area with the pupil intensity distribution 502, is received by the focus detection pixel 202 (photoelectric conversion unit 302). The present exemplary embodiment is described assuming that the shape of each of the first to third frames F1 to F3 is concentric about of the optical axis. However, a part or the whole of the shape of each frame may be a shape other than a circular shape. For example, each frame may have a polygonal shape or a so-called D-cut shape.

FIG. 12 illustrates the first pupil partial area 601 and the second pupil partial area 602 on the pupil plane at the position away from the image capturing plane by the incident pupil distance Z+dZ of the image sensor 107. The exit pupil corresponding to the area where opening portions of the first to third frames (F1 to F3) of the imaging optical system overlap one another is divided into the first pupil partial area 601 and the second pupil partial area 602 by the sensor incident pupil (the first pupil intensity distribution 501 and the second pupil intensity distribution 502) of the image sensor 107. The shape of each of the first pupil partial area 601 and the second pupil partial area 602 varies depending on each frame shape, the position in the z-direction of each frame, an image height, an error amount, or the like.

Figure 13:
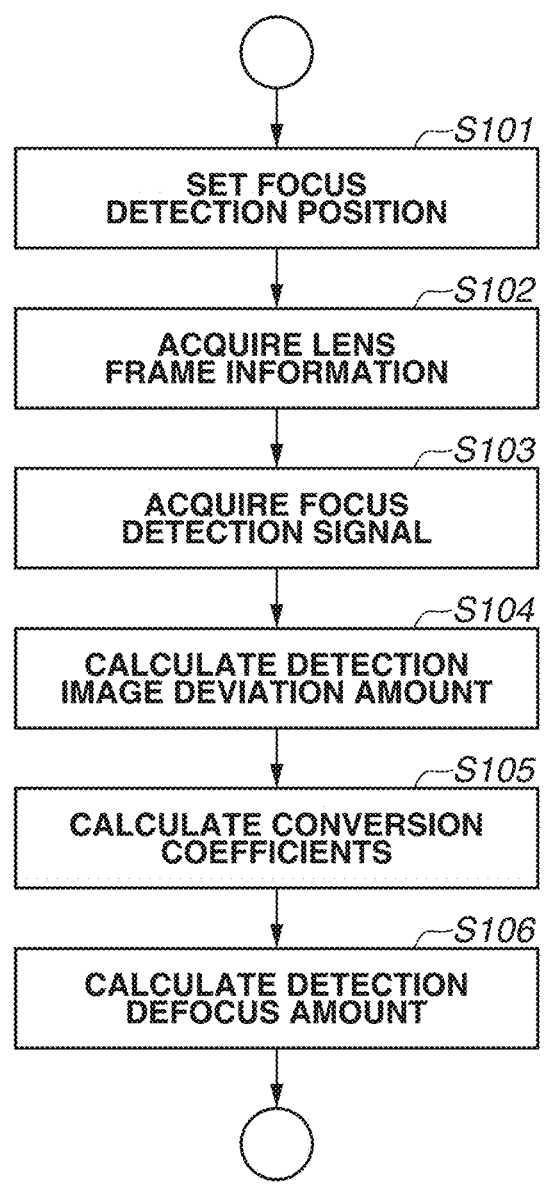
FIG. 13 is a flowchart illustrating a focus detecting method according to the first exemplary embodiment.
Figure 14:
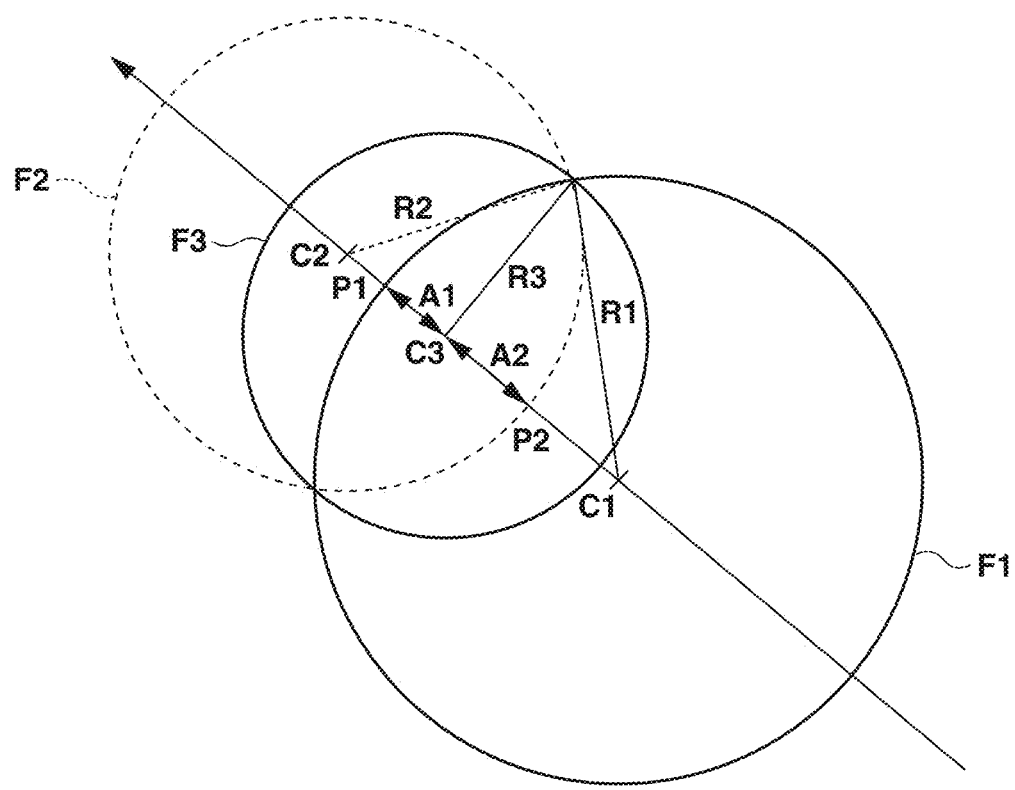
FIG. 14 is a relationship diagram illustrating lens frame vignetting in the imaging optical system according to the first exemplary embodiment.

A focus detecting method according to the present exemplary embodiment to be executed by the CPU 121 will be described below with reference to FIG. 13. FIG. 13 is a flowchart illustrating the focus detecting method according to the present exemplary embodiment. The focus detecting method according to the present exemplary embodiment is executed based on a focus detection program which is a computer program that runs on software and hardware. The focus detection program may be recorded in, for example, the storage unit 134 in the image capturing apparatus 100, or may be recorded in a computer-readable recording medium. Further, in the present exemplary embodiment, the CPU 121 executes the focus detecting method, but instead a PC or a dedicated apparatus may execute the focus detecting method according to the present exemplary embodiment as the focus detecting apparatus. Alternatively, a circuit corresponding to the focus detection program according to the present exemplary embodiment may be provided and the focus detecting method according to the present exemplary embodiment may be executed by operating the circuit.

In step S101 illustrated in FIG. 13, the CPU 121 operates as a focus detection position setting unit, and sets image height coordinates $(x_{AF}, y_{AF})$ of the focus detection position on the image sensor 107 to perform the focus detection. Next, an image height $r_{AF}$ of the focus detection position is calculated by an equation (6) from the image height coordinates $(x_{AF}, y_{AF})$. The origin of the image height coordinates corresponds to the centroid position of the light receiving area of the image sensor 107, and substantially matches the optical axis of the imaging optical system. However, since the image sensor 107 and the imaging optical system are positioned with predetermined variations, the position of the origin may be determined in consideration of the variations. Although not described in the present exemplary embodiment, the image height coordinates may be set in consideration of a shift amount of the optical axis position due to correction of hand shake or the like.

$$r_{AF} = \sqrt{x_{AF}^2 + y_{AF}^2} \quad (6)$$

In step S102 illustrated in FIG. 13, the lens information acquisition unit 121d of the CPU 121 serves as a frame information acquisition unit and acquires frame information depending on optical conditions. In particular, the lens information acquisition unit 121d acquires frame information depending on the optical conditions, such as the image height coordinates $(x_{AF}, y_{AF})$ of the focus detection position, and the focus state FS and the zoom state ZS of the imaging optical system (exchangeable lens). The frame information includes a center C1 $(x_{AF}, y_{AF}, FS, ZS)$ and a radius R1 $(x_{AF}, y_{AF}, FS, ZS)$ of the object-side first frame (object-side frame) F1 of the imaging optical system that is projected onto the pupil plane at the position away from the image forming plane of the imaging optical system (image capturing plane of the image sensor 107) by a predetermined pupil distance Zf. The frame information also includes a center C2 $(x_{AF}, y_{AF}, FS, ZS)$ and a radius R2 $(x_{AF}, y_{AF}, FS, ZS)$ of the image-side second frame (image-side frame) F2 of the imaging optical system. The frame information also includes the aperture value F $(x_{AF}, y_{AF}, FS, ZS)$ of the imaging optical system and the exit pupil distance LPO $(x_{AF}, y_{AF}, FS,$ ZS) of the diaphragm frame. The frame information is preliminarily recorded in a recording medium or the like of the imaging optical system, and is acquired from the imaging optical system by data communication between the imaging optical system and the image capturing apparatus 100 at an image capturing timing, or periodically at a predetermined period. Alternatively, frame information preliminarily stored in the recording medium of the image capturing apparatus 100 may be used. The data communication may be performed, for example, at a timing when lenses are exchanged, or upon start-up. The frame information may be acquired from an external apparatus via a network and stored. The optical conditions may include information other than the focus state FS and the zoom state ZS. For example, the optical conditions may include an extender attachment state, a tilt or shift amount, and various optical filter attachment states.

In step S102, a center C3 $(x_{AF}, y_{AF}, FS, ZS)$ of the third frame F3 of the imaging optical system that is projected at the pupil coordinates of the predetermined pupil distance Zf is then calculated by an equation (7) from the image height $r_{AF}$ and the exit pupil distance LPO of the diaphragm frame of the imaging optical system.

$$C3(x_{AF}, y_{AF}, FS, ZS) = r_{AF}\left(1 - \frac{Z_f}{LPO(x_{AF}, y_{AF}, FS, ZS)}\right) \quad (7)$$

In step S102, a radius R3 $(x_{AF}, y_{AF}, FS, ZS)$ of the third frame F3 of the imaging optical system that is projected at the pupil coordinates of the predetermined pupil distance Zf is then calculated by an equation (8) from the image height $r_{AF}$ and the aperture value F.

$$R3(x_{AF}, y_{AF}, FS, ZS) = \frac{Z_f}{\sqrt{4F^2 - 1}} \quad (8)$$

Figure 20A:
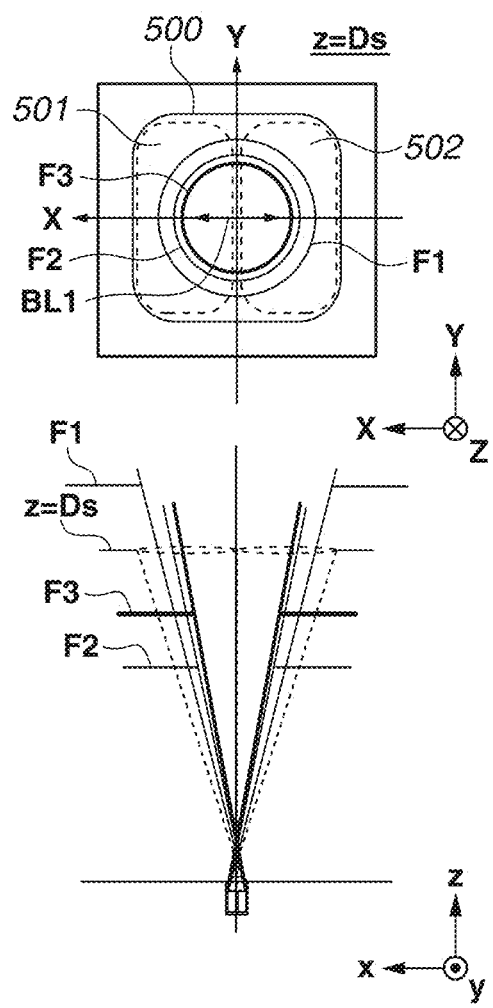
FIGS. 20A and 20B each schematically illustrate a lens frame vignetting state according to a third exemplary embodiment.
Figure 20B:
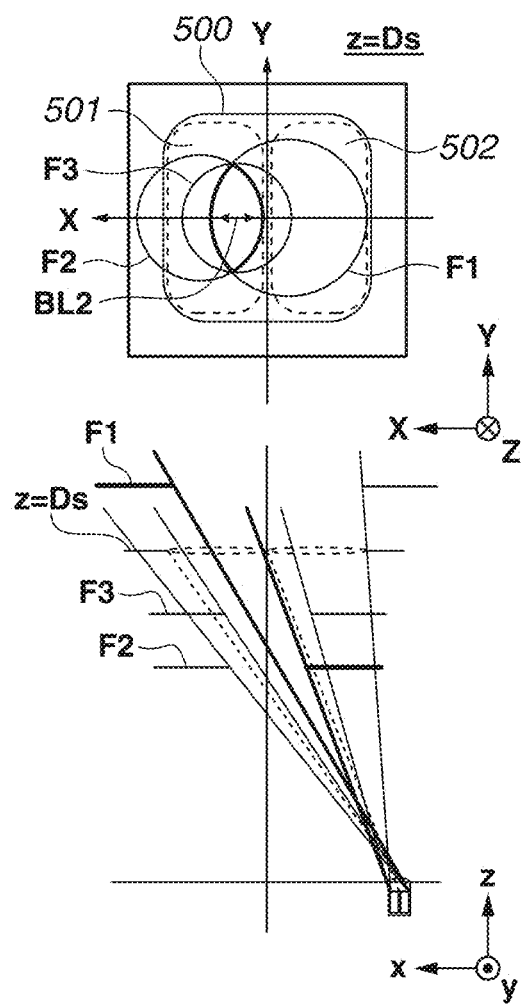

In step S102, a first opening parameter a1 and a second opening parameter a2 are then calculated from the frame information. FIGS. 20A and 20B each illustrate an example of the exit pupil, which corresponds to an area where the opening portions of the first to third frames (F1 to F3) of the imaging optical system overlap one another, on the pupil plane at the position away from the image forming plane (image capturing plane of the image sensor 107) of the imaging optical system by the predetermined pupil distance Zf.

The first opening parameter a1 $(0 \leq a1 \leq 1)$ is a value obtained by standardizing a distance A1 from the center C3 of the third frame to a peak P1 of the first frame by the radius R3 of the third frame, and is calculated by an equation (9A). Similarly, the second opening parameter a2 $(0 \leq a2 \leq 1)$ is a value obtained by standardizing a distance A2 from the center C3 of the third frame to a peak P2 of the second frame by the radius R3 of the third frame, and is calculated by an equation (9B).

$$a1 = \frac{R1 - |C1 - C3|}{R3} \quad (9A)$$

$$a2 = \frac{R2 - |C2 - C3|}{R3} \quad (9B)$$

In step S103 illustrated in FIG. 13, the pixel signal acquisition unit 121a of the CPU 121 acquires the pixel signals received by the focus detection pixel 201 and the focus detection pixel 202 of the pixels of the image sensor 107. Alternatively, the pixel signals that are obtained by preliminarily capturing an image by the image sensor 107 according to the present exemplary embodiment and are stored in the recording medium may be used.

In step S103, the signal generation unit 121b of the CPU 121 generates the first focus detection signals corresponding to the different first pupil partial areas 601 of the image optical system and the second focus detection signals corresponding to the different second pupil partial areas 602 of the imaging optical system based on the pixel signals. In other words, each focus detection signal is generated based on the signal from the pixel corresponding to the same pupil partial area. More specifically, each pixel signal obtained by capturing an image by the image sensor 107 is represented by LF. Further, the focus detection pixel signal that is an $i_S$ ($1 \leq i_S \leq Nx$)-th signal in the column direction and a $j_S$ ($1 \leq j_S \leq Ny$)-th signal in the row direction in each pixel signal LF is referred to as a k-th focus detection signal when $k=Nx(j_S-1)+i_S$ ($1 \leq k \leq N_{LF}$) holds. The k-th focus detection signal $I_k$ (j, i) that is an i-th signal in the column direction and a j-th signal in the row direction and corresponds to the k-th pupil area of the imaging optical system is generated by the following equation (10).

$$I_k(j,i) = I_{N_s(j_S-1)+i_s}(j,i) = LF(N_y(j-1)+j_S, N_x(i-1)+i_S) \quad (10)$$

The present exemplary embodiment illustrates an example in which k=1 and k=2 in a case where the pixel is divided into two areas in the x-direction when Nx=2, Ny=1, and $N_{LF}=2$. The signal from the first focus detection pixel 201, which is divided into two areas in the x-direction, is selected for each pixel from the pixel signals corresponding to the pixel array illustrated in FIG. 2. Accordingly, a first focus detection signal $I_1$ (j, i) that corresponds to the first pupil partial area 601 of the imaging optical system and is an RGB signal of a Bayer array having a resolution corresponding to the pixel number N (=horizontal pixel number $N_H$×vertical pixel number $N_V$) is generated. Similarly, a second focus detection signal $I_2$ (j, i) that corresponds to the second pupil partial area 602 of the imaging optical system is generated.

In step S103, a k-th focus detection luminance signal $Y_k$ (k=1, 2) is generated by the following equation (11) by matching the centers of RGB colors for each position (j, i) from the k-th focus detection signal $I_k$ (k=1, 2) which is the RGB signal of the Bayer array. If necessary, shading (light amount) correction processing or the like may be performed on the k-th focus detection luminance signal Yk so as to improve the focus detection accuracy.

$$Y_k = \begin{pmatrix} I_k(j-1, i-1) & I_k(j-1, i) & I_k(j-1, i+1) \\ I_k(j, i-1) & I_k(j, i) & I_k(j, i+1) \\ I_k(j+1, i-1) & I_k(j+1, i) & I_k(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix} \quad (11)$$

In step S103, one-dimensional band-pass filter processing in the pupil division direction (column direction) is then performed on the k-th focus detection luminance signal $Y_k$ (k=1, 2) to generate a first focus detection signal dYA that is limited to a substantial wavenumber $k_{AF}$ component. Further, one-dimensional band-pass filter processing in the pupil division direction (column direction) is performed on a second focus detection luminance signal $Y_2$ to generate a second focus detection signal dYB that is limited to the substantial wavenumber $k_{AF}$ component. As a one-dimensional band-pass filter, for example, a primary differential filter [1, 5, 8, 8, 8, 8, 5, 1, −1, −5, −8, −8, −8, −8, −5, −1] or the like can be used. If necessary, the passband of the one-dimensional band-pass filter is adjusted. In general, in the focus detection based on the phase difference detecting method, the focus detection is performed in a large defocus state, and thus the passband for filter processing is configured to include a flow frequency band. However, in the case of performing the focus adjustment in a range from the large defocus state to a small defocus state, the passband for filter processing during focus detection may be adjusted to a high frequency band, as needed, depending on the defocus state.

In step S104 illustrated in FIG. 13, the focus detection unit 121c of the CPU 121 serves as an image deviation amount detection unit and calculates a detection image deviation amount based on the focus detection signals. The first focus detection signal that is limited to the substantial wavenumber $k_{AF}$ component that is a $j_2$ ($-n_2 \leq j_2 \leq n_2$)-th component in the row direction and an $i_2$ ($-m_2 \leq i_2 \leq m_2$)-th component in the column direction, which is the pupil division direction, based on the focus detection position ($j_{AF}$, $i_{AF}$) is represented by dYA ($j_{AF}+j_2$, $i_{AF}+i_2$). The second focus detection signal is represented by dYB ($j_{AF}+j_2$, $i_{AF}+i_2$). When a shift amount is represented by s ($-n_s \leq s \leq n_s$), a correlation amount $COR_{EVEN}$ ($j_{AF}$, $i_{AF}$, s) at each position ($j_{AF}$, $i_{AF}$) is calculated by an equation (12A) and a correlation amount $COR_{ODD}$ ($j_{AF}$, $i_{AF}$, s) is calculated by an equation (12B).

$$COR_{even}(j_{AF}, i_{AF}, s) = \sum_{j_2=-n_3}^{n_2} \sum_{i_3=-m_3}^{m_2} |dYA(j_{AF}+j_2, i_{AF}+i_2+s) - dYB(j_{AF}+j_2, i_{AF}+i_2-s)| \quad (12A)$$

$$COR_{odd}(j_{AF}, i_{AF}, s) = \sum_{j_2=-n_3}^{n_2} \sum_{i_3=-m_3}^{m_2} |dYA(j_{AF}+j_2, i_{AF}+i_2+s) - dYB(j_{AF}+j_2, i_{AF}+i_2-1-s)| \quad (12B)$$

The correlation amount $COR_{ODD}$ ($j_{AF}$, $i_{AF}$, s) is a correlation amount obtained by shifting the shift amounts of the first focus detection signal dYA and the second focus detection signal dYB, which are limited to the substantial wavenumber $k_{AF}$ component, by a half phase of −1 with respect to the correlation amount $COR_{EVEN}$ ($j_{AF}$, $i_{AF}$, s).

In step S104 illustrated in FIG. 13, a shift amount of a real value at which the correlation amount becomes a minimum value is calculated by sub-pixel calculation from each of the correlation amount $COR_{EVEN}$ ($j_{AF}$, $i_{AF}$, s) and the correlation amount $COR_{ODD}$ ($j_{AF}$, $i_{AF}$, s), thereby calculating an average value. Then, a detection image deviation amount $q_{det}$ at the focus detection position ($j_{AF}$, $i_{AF}$) is calculated.

[Conversion Coefficient]

In step S105 illustrated in FIG. 13, the focus detection unit 121c of the CPU 121 serves as a conversion coefficient acquisition unit and calculates a conversion coefficient K for converting the detection image deviation amount $q_{det}$ into a detection defocus amount $q_{det}$. The calculation of the conversion coefficient K in step S105 will be described in detail with reference to FIG. 15. Although the present exemplary embodiment illustrates an example in which processing of each step is performed by the focus detection unit 121c of the CPU 121, a part of the process of calculating the conversion coefficient K may be performed by an external PC or the like, and the calculation result may be stored in a memory or the like. A calculation load on the CPU 121 can be reduced by preliminarily performing a part of the calculation process.

Figure 15:
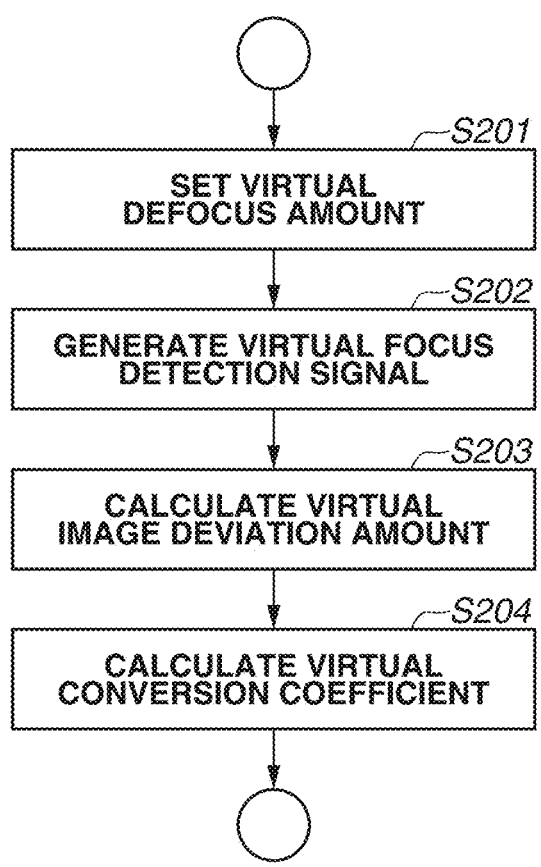
FIG. 15 is a flowchart illustrating a conversion coefficient calculation method according to the first exemplary embodiment.

FIG. 15 is a flowchart illustrating the method of calculating the conversion coefficient K according to the present exemplary embodiment. In step S201 illustrated in FIG. 15, the focus detection unit 121c of the CPU 121 serves as a virtual defocus amount setting unit and sets a virtual defocus amount $d_{vir}$. The virtual defocus amount $d_{vir}$ used in the present exemplary embodiment is a hypothetical defocus amount for calculating an opening parameter for determining the conversion coefficient K. For example, a state of being defocused by a predetermined amount that enables an object to be sufficiently blurred in the front focus state ($d_{vir}<0$), or a state of being defocused by a predetermined amount in the rear focus state ($d_{vir}>0$) is set. Alternatively, the conversion coefficient K may be calculated using a plurality of virtual defocus amounts $d_{vir}$. The conversion coefficient K that is obtained as described below is calculated by a ratio between the virtual defocus amount $d_{vir}$ and the detection image deviation amount gad which are substantially in a linear relation. In other words, the conversion coefficient K corresponds to an inclination when the horizontal axis represents the virtual defocus amount $d_{vir}$ and the vertical axis represents the detection image deviation amount $q_{det}$. Accordingly, the setting of the virtual defocus amount $d_{vir}$ is calculated in both the front focus state and the rear focus state, thereby making it possible to calculate the conversion coefficient K as an inclination with high accuracy.

In step S202 illustrated in FIG. 15, the focus detection unit 121c of the CPU 121 serves as a virtual focus detection signal generation unit and generates the virtual defocus amount $d_{vir}$ and the sensor incident pupil (the first pupil intensity distribution and the second pupil intensity distribution) of the image sensor 107. Further, the focus detection unit 121c generates the pupil eccentric amount dX for each image sensor, the incident pupil distance Z for each image sensor, and the image height coordinates ($x_{AF}$, $y_{AF}$). Then, the focus detection unit 121c generates a first virtual focus detection signal $VI_1$ (j, i|$d_{vir}$, dX, Z, $x_{AF}$, $y_{AF}$, F, LPO, a1, a2) and a second virtual focus detection signal $VI_2$ (j, i|$d_{vir}$, dX, Z, $x_{AF}$, $y_{AF}$, F, LPO, a1, a2). These correspond to the frame information (the aperture value F, the exit pupil distance LPO of the diaphragm frame, the first opening parameter a1, and the second opening parameter a2) about the imaging optical system. Furthermore, the focus detection unit 121c generates the first virtual focus detection signal $VI_1$ (j, i|$d_{vir}$, dX, Z, $x_{AF}$, $y_{AF}$, F, LPO, a1, a2) and the second virtual focus detection signal $VI_2$ (j, i|$d_{vir}$, dX, Z, $x_{AF}$, $y_{AF}$, F, LPO, a1, a2) corresponding to the frame information about the imaging optical system. The frame information about the imaging optical system includes the aperture value F, the exit pupil distance LPO of the diaphragm frame, the first opening parameter a1, and the second opening parameter a2. However, the frame information is not limited to these examples. The sensor incident pupil (the first pupil intensity distribution and the second pupil intensity distribution) of the image sensor 107, the pupil eccentric amount dX for each image sensor, and the incident pupil distance Z for each image sensor are values that can vary from product to product. Accordingly, these values are measured during factory production and stored in a memory as adjusted values or fixed values. The image height coordinates ($x_{AF}$, $y_{AF}$) are values that are automatically determined by a user's operation or the CPU 121, and vary depending on the image capturing timing. Therefore, the values are acquired every time a calculation is performed. Further, since the frame information (the aperture value F and the exit pupil distance LPO of the diaphragm frame) about the imaging optical system indicates values that can vary depending on the image capturing timing, the values are acquired every time a calculation is performed. In addition, the first opening parameter a1 and the second opening parameter a2, which are features of the aspect of the embodiments, can also vary depending on the image capturing timing as represented by the equation (9A) and the equation (9B). These values are acquired by data communication between the imaging optical system (exchangeable lens) and the image capturing apparatus (camera) 100 at an image capturing timing, or periodically. Thus, the conversion coefficient K can be calculated using parameters, which comply with the image capturing conditions corresponding to acquisition conditions for acquiring image signals, by acquiring parameters, as needed, by data communication. The acquisition conditions may include conditions other than the conditions described in the present exemplary embodiment.

In the related art, not only the dependent parameters (dX, Z, $x_{AF}$, $y_{AF}$, F, LPO) for the conversion coefficient K, but also the values of the center C1 and the radius R1 of the first frame of the imaging optical system and the center C2 and the radius R2 of the second frame of the imaging optical system are used to calculate the conversion coefficient K. On the other hand, in the method of calculating the conversion coefficient K according to the present exemplary embodiment, the first opening parameter a1 is used that is calculated from the center C1 and the radius R1 of the first frame of the imaging optical system and indicates the ratio of lens frame vignetting. Further, the conversion coefficient K is calculated from the center C2 and the radius R2 of the second frame of the imaging optical system. The second opening parameter a2 indicating the ratio of lens frame vignetting is also used to reduce the total number of the dependent parameters (dX, Z, $x_{AF}$, $y_{AF}$, F, LPO, a1, a2) for the conversion coefficient K.

Figure 16:
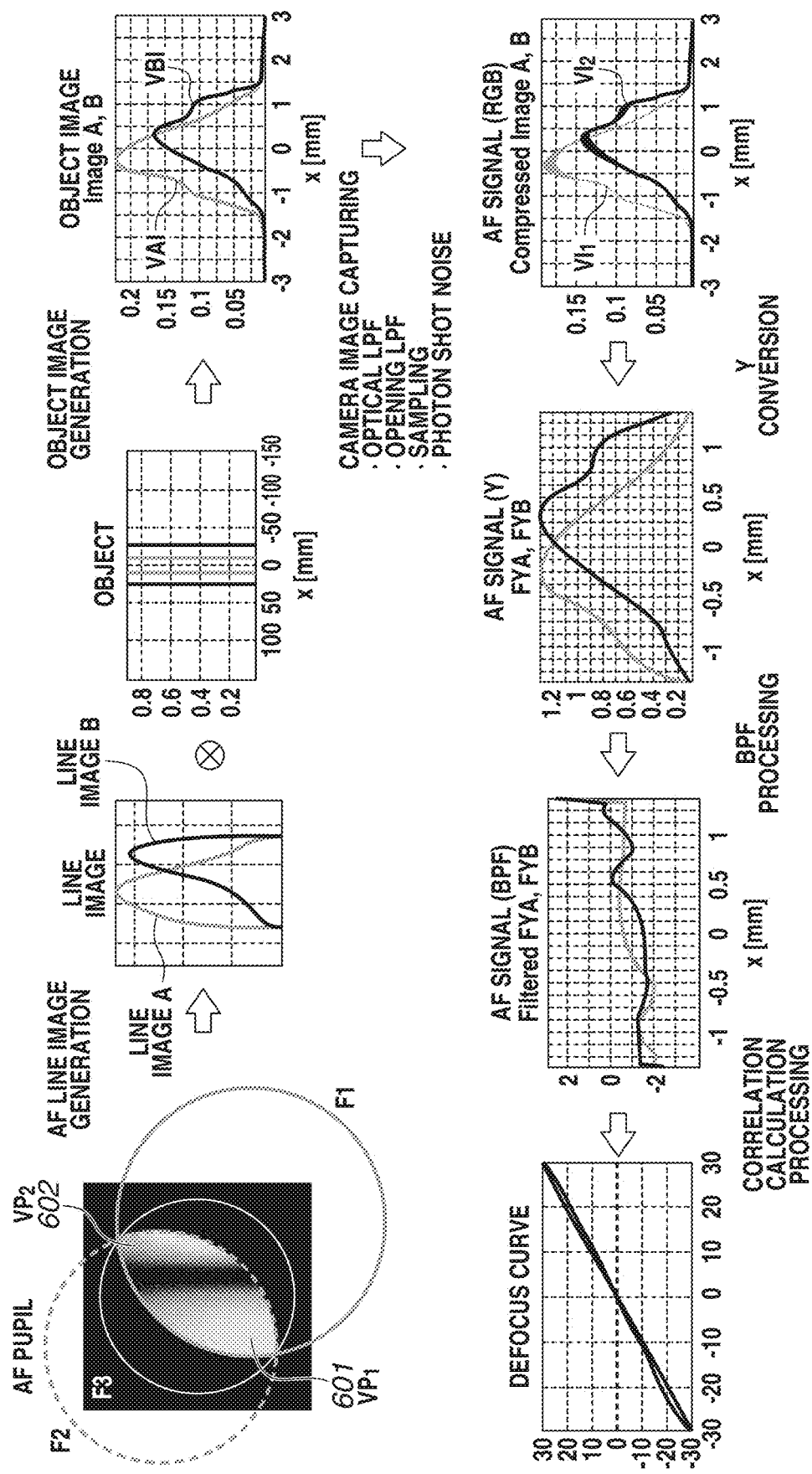
FIG. 16 illustrates a method for generating virtual focus detection signals according to the first exemplary embodiment.

FIG. 16 illustrates a method for generating the virtual focus detection signals (the first virtual focus detection signal $VI_1$ and the second virtual focus detection signal $VI_2$) according to the present exemplary embodiment. As illustrated in the upper left diagram in FIG. 16, the CPU 121 first acquires the first pupil intensity distribution 501 and the second pupil partial area 602 of the image sensor 107, the pupil eccentric amount dX, the incident pupil distance Z, the image height coordinates ($x_{AF}$, $y_{AF}$), the aperture value F of the imaging optical system, and the exit pupil distance LPO of the diaphragm frame. Further, the CPU 121 acquires the first opening parameter a1 ($0 \leq a1 \leq 1$) and the second opening parameter a2 ($0 \leq a2 \leq 1$). The values are stored in a memory as fixed values or a table before the processing in the flowchart is started, or simultaneously with the start of the processing, or the values are based on image capturing conditions designated by a user and acquired in a memory or the like.

Next, the center C3 of the third frame (diaphragm frame) F3 of the imaging optical system that is projected at the pupil coordinates of the predetermined pupil distance Zf is calculated by the equation (7) from the exit pupil distance LPO of the diaphragm frame of the imaging optical system. The radius R3 of the third frame (diaphragm frame) F3 of the imaging optical system that is projected at the pupil coordinates of the predetermined pupil distance Zf is calculated by the equation (8) from the aperture value F of the imaging optical system.

Next, as illustrated in FIGS. 20A and 20B, based on a model assuming that the first to third frames (F1 to F3) intersect with one another at the same point, the radius R1 of the first frame used for generating the virtual focus detection signal is calculated by an equation (13A) from the first opening parameter a1. Similarly, the radius R2 of the second frame used for generating the virtual focus detection signal is calculated by an equation (13B) from the second opening parameter a2. In general, the first to third frames (F1 to F3) do not intersect with one another at the same point, but these are typical arrangements in the actual image capturing optical system. When the arrangement in which the first to third frames intersect with one another at the same point is used as a model, the shape of each of the first frame F1 and the second frame F2 can be accurately calculated with less parameters. Consequently, the accuracy of calculating the conversion coefficient K can be improved.

$$R1 = \frac{(a1 \times R3)^2 + R3^2}{2(a1 \times R3)} \quad (13A)$$

$$R2 = \frac{(a2 \times R3)^2 + R3^2}{2(a2 \times R3)} \quad (13B)$$

Next, the radius R1 of the first frame used for generating the virtual focus detection signal is calculated by the equation (9A) from the first opening parameter a1. Similarly, the radius R2 of the second frame used for generating the virtual focus detection signal is calculated by the equation (9B) from the second opening parameter a2.

As illustrated in the central diagram in the upper stage of FIG. 16, a first virtual pupil partial area VP$_1$ and a second virtual pupil partial area VP$_2$ are then generated. These areas correspond to the first pupil intensity distribution 501 and the second pupil intensity distribution 502 of the image sensor, the pupil eccentric amount dX for each image sensor, the incident pupil distance Z for each image sensor, the image height coordinates (x$_{AF}$, y$_{AF}$), and the first to third frames (F1 to F3) of the imaging optical system.

As illustrated in the central diagram in the upper stage of FIG. 16, the first virtual pupil partial area VP$_1$ is projected in a direction vertical to the pupil division direction, and scale conversion is performed depending on a size |d$_{vir}$| of the virtual defocus amount d$_{vir}$, to thereby generate a first virtual line image A. Similarly, the second virtual pupil partial area VP$_2$ is projected in the direction vertical to the pupil division direction, and scale conversion is performed depending on the size |d$_{vir}$| of the virtual defocus amount d$_{vir}$, to thereby generate a second virtual line image B. When the virtual defocus amount d$_{vir}$<0 holds in the front focus state, the first virtual line image A and the second virtual line image B are inverted in a left-and-right direction with respect to the centroid position of a line image A+B obtained by adding the first virtual line image A and the second virtual line image B.

As illustrated in the central diagram to the right diagram in the upper stage of FIG. 16, a convolution integral (convolution) between the virtual line images (the first virtual line image A and the second virtual line image B) and an object signal is performed to generate virtual object images (a first virtual object image VAI and a second virtual object image VBI).

As illustrated in the upper right diagram to the lower right diagram in FIG. 16, optical low-pass filter processing, pixel opening low-pass filter processing, pixel sampling processing in the RGB Bayer array (FIG. 2), and the like are sequentially and virtually performed on the virtual object images (the first virtual object image VAI and the second virtual object image VBI). Further, the first virtual focus detection signal VI$_1$ (j, i|d$_{vir}$, dX, Z, x$_{AF}$, y$_{AF}$, F, LPO, a1, a2) and the second virtual focus detection signal VI$_2$ (j, i|d$_{vir}$, dX, Z, x$_{AF}$, y$_{AF}$, F, LPO, a1, a2) are generated.

In step S203 illustrated in FIG. 15 (and in the lower stage of FIG. 16), the focus detection unit 121c of the CPU 121 sequentially and virtually performs focus detection processing equivalent to that for the image capturing apparatus on the virtual focus detection signals (the first virtual focus detection signal VI$_1$ and the second virtual focus detection signal VI$_2$). The processing includes at least the calculation of the equation (11) in step S103 and the sub-pixel calculation and shift amount averaging calculation in step S104. Then, a virtual image deviation amount q$_{vir}$ (d$_{vir}$, dX, Z, x$_{AF}$, y$_{AF}$, F, LPO, a1, a2) is calculated. In the calculation of the virtual image deviation amount q$_{vir}$, various types of virtual line images and object signals for performing a convolution integral are used to improve the calculation accuracy. For example, a convolution integral is performed between a plurality of object signals having different spatial frequency bands and virtual line images, and averaging or weighted addition or the like is performed on the resultant, thereby enabling the calculation with high accuracy.

In step S204 illustrated in FIG. 15, the virtual defocus amount d$_{vir}$ is divided by the calculated virtual image deviation amount q$_{vir}$, thereby calculating the conversion coefficient K (dX, Z, x$_{AF}$, y$_{AF}$, F, LPO, a1, a2). In the calculation of the conversion coefficient K, a plurality of virtual defocus amounts d$_{vir}$ or object signals are used as described above. Although the calculation load or calculation time increases, the effect that the calculation accuracy is improved can be obtained.

Referring again to FIG. 13, in step S106 illustrated in FIG. 13, a detection defocus amount calculation unit multiplies the detection image deviation amount q$_{det}$ by the conversion coefficient K (dX, Z, x$_{AF}$, y$_{AF}$, F, LPO, a1, a2), thereby calculating the detection defocus amount d$_{det}$. Although the present exemplary embodiment illustrates an example in which the detection defocus amount d$_{det}$ is calculated for the pixel signals output from the image sensor 107, the calculation method is not limited to the example. The calculation may be executed on pixel signals stored in a memory or the like.

The present exemplary embodiment illustrates the focus detecting apparatus that performs focus detection using pixel signals obtained by performing photoelectric conversion on the light which has passed through different pupil areas of the imaging optical system. The focus detecting apparatus includes an acquisition unit that acquires pixel signals, a signal generation unit that generates a plurality of focus detection signals corresponding to different pupil areas by using the pixel signals, and a calculation unit that calculates a detection image deviation amount based on the plurality of focus detection signals. The focus detecting apparatus also includes a focus detection unit that detects a detection defocus amount from the detection image deviation amount and a conversion coefficient. The focus detection unit sets a virtual defocus amount to generate a plurality of virtual focus detection signals corresponding to the different pupil areas. Thus, the virtual image deviation amount is calculated from the correlation amount of the virtual focus detection signals, and calculates the conversion coefficient from the virtual image deviation amount and the virtual defocus amount.

The present exemplary embodiment uses an image sensor including an array of a plurality of pixels that receive light which has passed through different pupil areas of the imaging optical system, and pixel signals acquired by the pixels. The focus detecting apparatus according to the present exemplary embodiment includes a signal generation unit that generates a plurality of focus detection signals corresponding to different pupil areas, and a focus detection unit that calculates a detection image deviation amount based on the plurality of focus detection signals, and detects a detection defocus amount from the detection image deviation amount and a conversion coefficient. The focus detection unit calculates the conversion coefficient based on the pupil eccentric amount of the image sensor, the incident pupil distance of the image sensor, and opening information about a plurality of frames of the imaging optical system.

As described above, in a lens-interchangeable camera according to the present exemplary embodiment, the conversion coefficient K (dX, Z, $x_{AF}$, $y_{AF}$, F, LPO, a1, a2) can be calculated with high accuracy for any combination of each image sensor and each exchangeable lens (imaging optical system). Specifically, based on optical characteristics of each image sensor and optical characteristics of each exchangeable lens (imaging optical system), focus detection processing using the phase difference detecting method in the image capturing apparatus is virtually reproduced, thereby making it possible to calculate the conversion coefficient K (dX, Z, $x_{AF}$, $y_{AF}$, F, LPO, a1, a2) with high accuracy. Consequently, the focus detection can be performed with high accuracy.

While the present exemplary embodiment illustrates an example in which the CPU 121 calculates the conversion coefficient K based on the processing flow illustrated in FIG. 15, the conversion coefficient K corresponding to each of the setting parameters (dX, Z, $x_{AF}$, $y_{AF}$, F, LPO, a1, a2) may be calculated in advance. The conversion coefficient K obtained as a result of calculation is stored in the storage unit 134 or the like in the image capturing apparatus 100.

Figure 17:
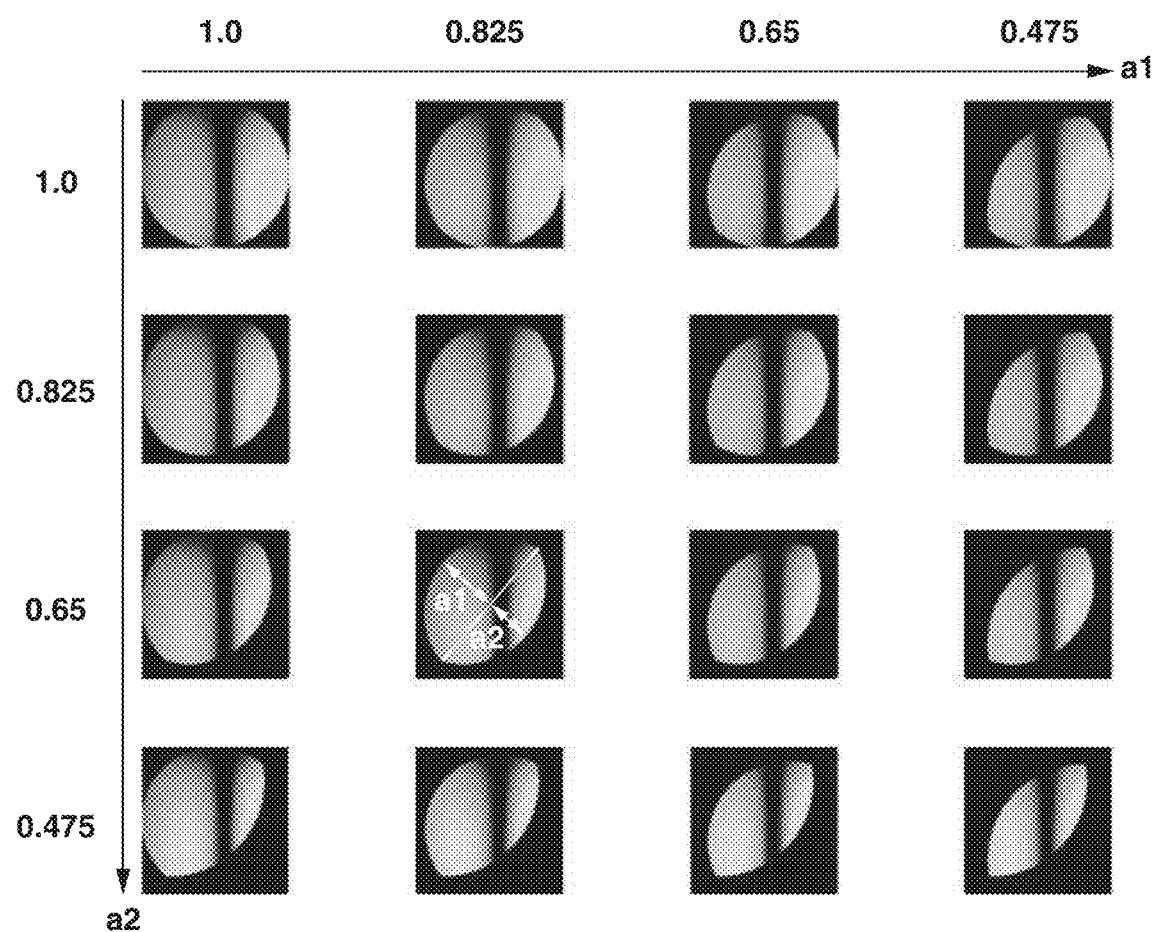
FIG. 17 illustrates variation examples of a virtual pupil intensity distribution according to the first exemplary embodiment.

FIG. 17 illustrates variation examples of virtual pupil intensity distributions (the first virtual pupil partial area and the second virtual pupil partial area) by setting the parameters of the first opening parameter a1 (0≤a1≤1) and the second opening parameter a2 (0≤a2≤1).

In a modified example of the present exemplary embodiment, an inverse 1/K (dX, Z, $x_{AF}$, $y_{AF}$, F, LPO, a1, a2) of the conversion coefficient K is approximated with polynomial functions of a variable (1−a1) and a variable (1−a2) in order to reduce the amount of data to be stored in the storage unit 134 in the image capturing apparatus 100. Further, a coefficient $PD_{\alpha\beta}$ (dX, Z, $x_{AF}$, $y_{AF}$, F, LPO) in each order of the polynomial is stored in a memory. Specifically, in step S105, the CPU 121 serves as the conversion coefficient acquisition unit and calculates the conversion coefficient K (dX, Z, $x_{AF}$, $y_{AF}$, F, LPO, a1, a2) by an equation (14), instead of calculating the conversion coefficient K based on the processing flow illustrated in FIG. 15.

$$K(dX, Z, x_{AF}, y_{AF}, F, LPO, a1, a2) = \quad (14)$$

$$\frac{1}{\sum_{\alpha=0}^{2} \sum_{\beta=0}^{2} PD_{\alpha\beta}(dX, Z, x_{AF}, y_{AF}, F, LPO) / (1-a1)^{\alpha} / (1-a2)^{\beta}}$$

In the modified example, the coefficient $PD_{\alpha\beta}$ (dX, Z, $x_{AF}$, $y_{AF}$, F, LPO) is stored in a memory, and the CPU 121 of the image capturing apparatus 100 calculates the conversion coefficient K depending on the image capturing timing or the like. Thus, the calculation load can be reduced by using the preliminarily calculated coefficient and the equation (14), without executing the processing flow illustrated in FIG. 15. Since the coefficient $PD_{\alpha\beta}$ does not include the first opening parameter a1 and the second opening parameter a2, the coefficient $PD_{\alpha\beta}$ can be calculated regardless of the image capturing optical system, as long as the range in which the aperture value F can be set and the range in which the exit pupil distance LPO of the diaphragm frame can be set are determined. Further, the conversion coefficient K according to the present exemplary embodiment may be calculated by providing a circuit for calculating the conversion coefficient K according to the present exemplary embodiment and operating the circuit, or the conversion coefficient K may be calculated in advance by the equation (14) and may be stored in a memory. The memory for storing the conversion coefficient K may be provided in the camera body, or a part or the whole of the conversion coefficient K may be stored in the memory for the lens and acquired via the lens communication circuit 130. The opening information may be acquired for each frame, or a plurality of pieces of frame information may be collectively acquired.

When the aperture value F is sufficiently larger (smaller aperture) than that illustrated in FIG. 12, the first pupil partial area 601 and the second pupil partial area 602 are determined by the third frame F3 with little influence of the first frame F1 and the second frame F2. In other words, the degree of dependence of the value of the conversion coefficient K on the first opening parameter a1 and the second opening parameter a2 decreases. Accordingly, the calculation of the conversion coefficient K according to the present exemplary embodiment is suitable when the aperture value F is small. On the other hand, when the aperture value F is large, the calculation can be omitted depending on the calculation load. In other words, if the dependence on the first opening parameter a1 and the second opening parameter a2 is low, for example, when the aperture value F is large, both the focus detection with high accuracy and the reduction in calculation load can be achieved by omitting a part of the calculation according to the present exemplary embodiment.

An image capturing apparatus according to a second exemplary embodiment will be described with reference to FIG. 18 and FIGS. 19A and 19B. The image capturing apparatus according to the second exemplary embodiment differs from the image capturing apparatus according to the first exemplary embodiment in regard to the configuration of the image sensor. The other components of the second exemplary embodiment are similar to those of the first exemplary embodiment, and thus detailed descriptions thereof are omitted. In the image sensor 107 according to the present exemplary embodiment, each pixel includes first to fourth sub-pixels, and an image capturing signal (captured image) is generated by adding and reading out signals from the first to fourth sub-pixels.

Figure 18:
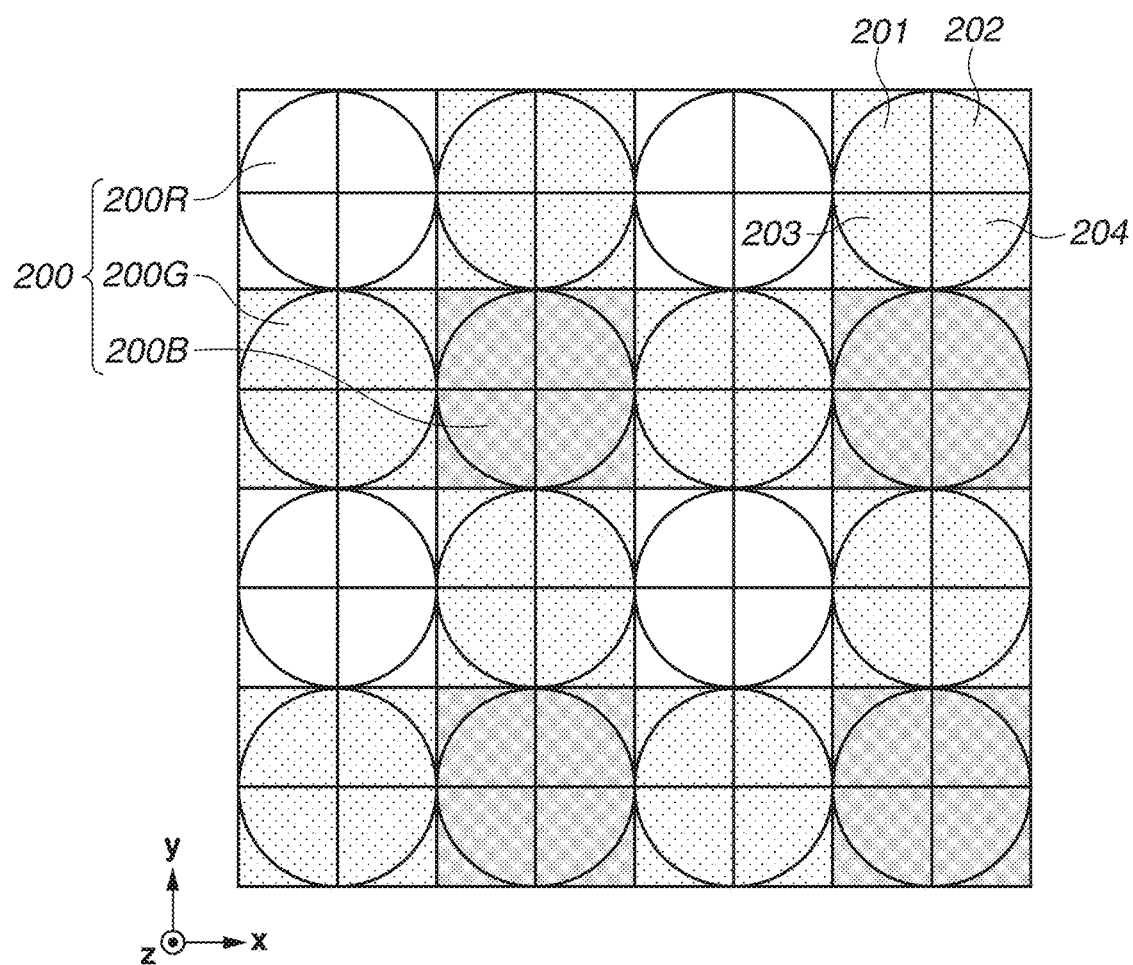
FIG. 18 illustrates a pixel array according to a second exemplary embodiment.

FIG. 18 illustrates an array of pixels (image capturing pixels) of the image sensor 107. FIGS. 19A and 19B each illustrate a pixel structure of the image sensor 107. FIG. 19A is a plan view of the pixel 200G of the image sensor 107 (viewed along the +z-direction), and FIG. 19B is a sectional view taken along the line a-a in FIG. 19A (viewed along the −y-direction).

FIG. 18 illustrates the pixel array of the image sensor 107 in a range of four rows×four columns. In the present exemplary embodiment, the pixels (pixels 200R, 200G, and 200B) are each composed of four sub-pixels 201, 202, 203, and 204. Accordingly, FIG. 18 illustrates the array of sub-pixels in a range of eight rows×eight columns.

As illustrated in FIG. 18, in the pixel group 200 of two rows×two columns, the pixels 200R, 200G, and 200B are arranged in a Bayer array. Specifically, in the pixel group 200, the pixel 200R having spectral sensitivity of red (R) is located at an upper left position, the pixels 200G each having spectral sensitivity of green (G) are located at upper right and lower left positions, and the pixel 200B having spectral sensitivity of blue (B) is located at a lower right position. The pixels 200R, 200G, and 200B are each composed of sub-pixels (focus detection pixels) 201, 202, 203, and 204 which are arranged in an array of two rows×two columns. The sub-pixel (first sub-pixel) 201 is a pixel that receives the light beam which has passed through a first pupil partial area of the imaging optical system. The sub-pixel (second sub-pixel) 202 is a pixel that receives the light beam which has passed through a second pupil partial area of the imaging optical system. The sub-pixel (third sub-pixel) 203 is a pixel that receives the light beam which has passed through a third pupil partial area of the imaging optical system. The sub-pixel (fourth sub-pixel) 204 is a pixel that receives the light beam which has passed through a fourth pupil partial area of the imaging optical system.

As illustrated in FIG. 18, the image sensor 107 is configured in such a manner that a large number of pixels of four rows×four columns (sub-pixels of eight rows×four columns) are arranged on a plane, and outputs image capturing signals (sub-pixel signals). In the image sensor 107 according to the present exemplary embodiment, the period P of pixels is 6 μm, and the number N of pixels is horizontally 6,000 columns×vertically 4,000 rows=24 million pixels. In the image sensor 107, the period $P_{SUB}$ of sub-pixels in the column direction is 3 μm, and the number $N_{SUB}$ of sub-pixels is horizontally 12,000 columns×vertically 8,000 rows=96 million pixels.

As illustrated in FIG. 19B, the pixel 200G according to the present exemplary embodiment is provided with the microlenses 305 for condensing the incident light on the light-receiving surface side of the pixel. The plurality of microlenses 305 is two-dimensionally arrayed and is disposed at a position away from the light-receiving surface by a predetermined distance in the z-axis direction (direction of the optical axis OA). In the pixel 200G, photoelectric conversion units 301, 302, 303, and 304 are formed by dividing the pixel into $N_H$ (two divisions) in the x-direction and into Nv (two divisions) in the y-direction. The photoelectric conversion units 301 to 304 correspond to the sub-pixels 201 to 204, respectively.

In the present exemplary embodiment, the first focus detection signals are generated on pixel signals from the sub-pixels 201 and 203 of the pixels of the image sensor 107, and the second focus detection signals are generated based on pixel signals from the sub-pixels 202 and 204 of the pixels of the image sensor 107, thereby performing the focus detection. Further, the signals from the sub-pixels 201, 202, 203, and 204 are added and read out for each pixel of the image sensor 107, thereby making it possible to generate an image capturing signal (captured image) having a resolution corresponding to the effective pixel number N.

The first focus detection signal may be generated based on the pixel signals from the sub-pixels 201 and 202. In this case, the second focus detection signal is generated based on the pixel signals from the sub-pixels 203 and 204. The first focus detection signal may be generated based on the pixel signals from the sub-pixels 201 and 204. In this case, the second focus detection signal is generated based on the pixel signals from the sub-pixels 202 and 203.

Figure 23:
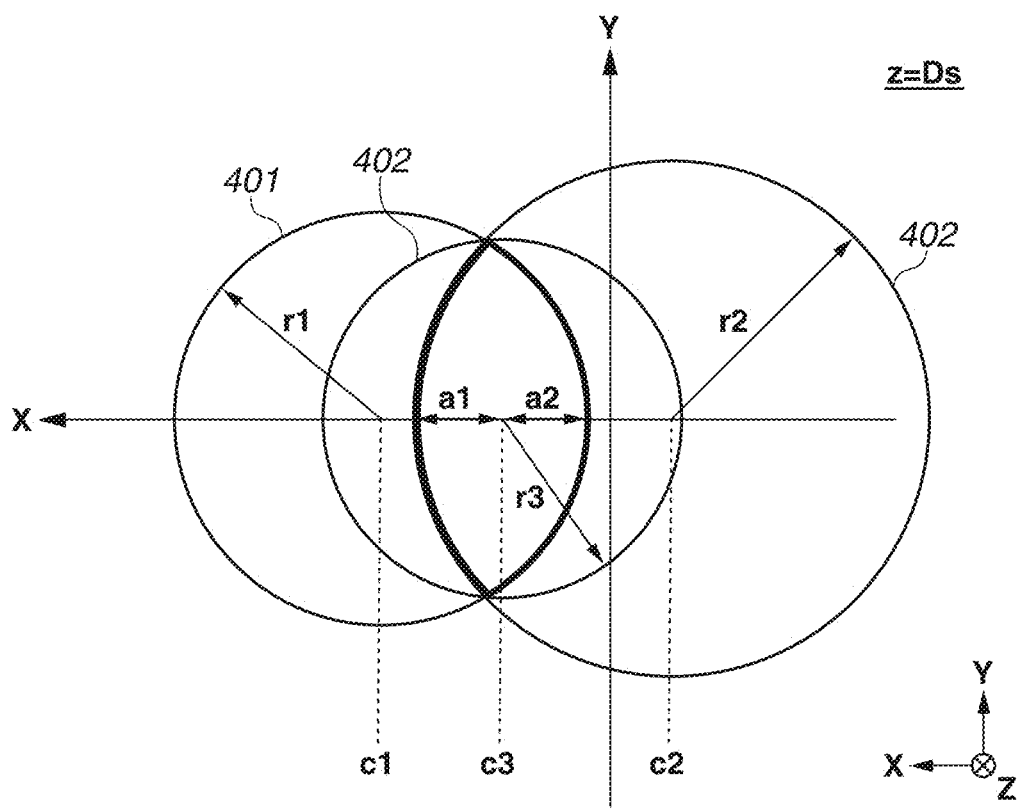
FIG. 23 is a schematic relationship diagram illustrating a central position and a size of each piece of opening information at a pupil distance of an image sensor according to each exemplary embodiment.

The conversion coefficient calculation (step S105 illustrated in FIG. 13) according to a third exemplary embodiment will be described with reference to FIGS. 20A and 20B and FIG. 23. Components similar to those of the first exemplary embodiment or the second exemplary embodiment are denoted by the same reference numerals and detailed descriptions thereof are omitted.

[Base Line Length]

Next, the relationship between lens frame vignetting and a base line length will be described with reference to FIGS. 20A and 20B and FIG. 15. FIGS. 20A and 20B each schematically illustrate lens frame vignetting and correspond to FIG. 12. FIG. 20A illustrates a frame vignetting state when the focus detection area including image height coordinates is set at a middle image height (($x_{AF}$, $y_{AF}$)=(0, 0)). In the case of the middle image height illustrated in FIG. 20A, frame vignetting is caused by the diaphragm frame F3, and the base line length corresponds to a length BL1.

FIG. 20B illustrates a frame vignetting state when the focus detection area is set at a peripheral image height (($x_{AF}$, $y_{AF}$)=(−10, 0)). In the case of the peripheral image height illustrated in FIG. 20B, frame vignetting is caused by the diaphragm frame F3, the object-side frame F1, and the image-side frame F2, and the base line length corresponds to a length BL2. That is, at the peripheral image height, vignetting is caused by a plurality of lens frames, so that the base line length BL2 illustrated in FIG. 20B is shorter than the base line length BL1 illustrated in FIG. 20A. Further, since vignetting is caused by a plurality of frames, the opening shape is not a circular shape, but is a complicated shape. Accordingly, in order to calculate an accurate base line length at a peripheral image height, calculation in consideration of the complicated opening shape by using each frame information is performed.

Figure 21A:
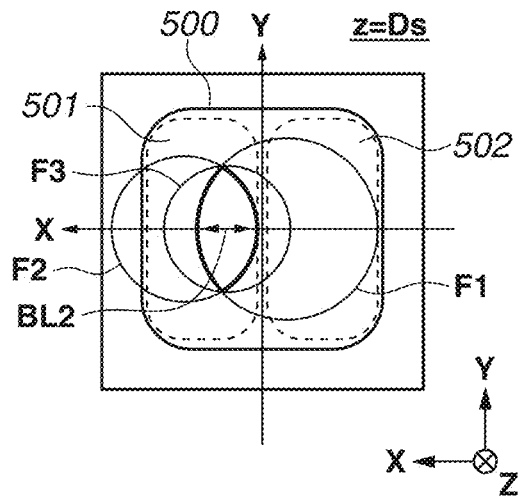
FIGS. 21A, 21B, 21C, and 21D each schematically illustrate a lens frame vignetting state at each image height according to the third exemplary embodiment.
Figure 21B:
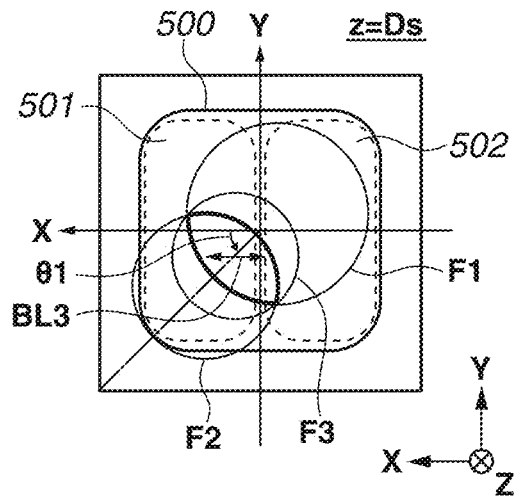
Figure 21C:
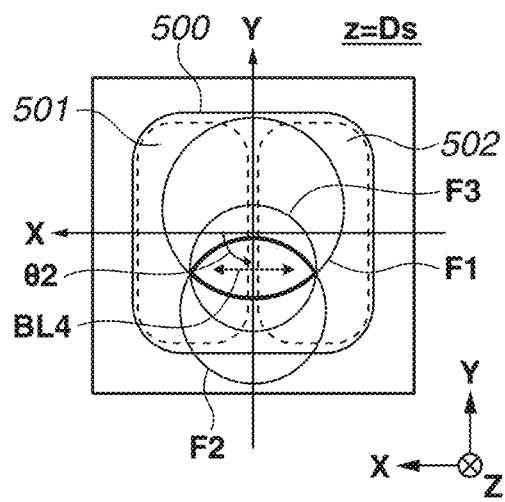
Figure 21D:
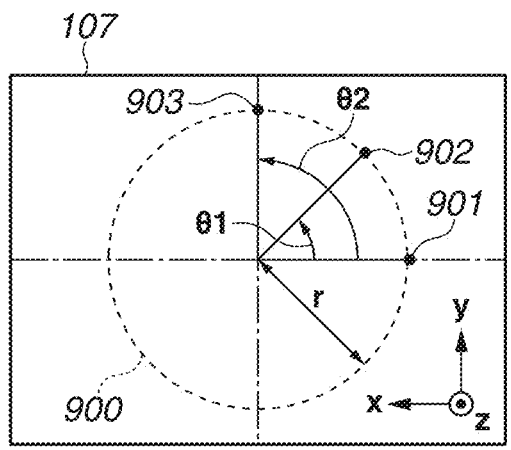

FIGS. 21A, 21B, 21C, and 21D each schematically illustrate a lens frame vignetting state at each image height. FIGS. 21A to 21C each illustrate a frame vignetting state when the focus detection area is set at the image height coordinates ($x_{AF}$, $y_{AF}$)=(−10, 0), (−3.2, −3.2), and (0, −10). The respective image heights correspond to positions where the distance r from the middle image height is 10 and correspond to positions 901 to 903 illustrated in FIG. 21D. In FIG. 21D, a position 900 represents the image height position where the distance from the middle image height is 10.

Based on the image height 901 (image height when Y=0, X<0), the image height 902 corresponds to the position rotated by θ1 with respect to the image height 901, and the image height 903 corresponds to the position rotated by θ2 with respect to the image height 901. On the pupil plane (z=Ds) of the image sensor 107, the opening shape with respect to the image height at the position 900 is in the state of being rotated by the rotation angle θ with the same shape. FIGS. 21B and 21C illustrate states where the respective opening shapes are rotated by the rotation angles θ1 and θ2 with respect to FIG. 21A. In each of FIGS. 21A to 21C, vignetting is caused by the diaphragm frame F3, the object-side frame F1, and the image-side frame F2, and the opening shape is the same. However, since different rotation angles are set, the base line lengths correspond to lengths BL2 to BL4 which are different from one another.

As described above, the base line length is determined by the lens frame vignetting shape (first opening information, second opening information, and third opening information) and the rotation angle on the pupil plane of the image sensor 107.

[Conversion Coefficient Calculation]

Next, the conversion coefficient calculation (step S105 illustrated in FIG. 13) according to the present exemplary embodiment will be described with reference to FIG. 22. FIG. 22 is a flowchart illustrating the conversion coefficient calculation according to the present exemplary embodiment. Each step illustrated in FIG. 22 is mainly executed by the CPU 121 or the CPU for the lens.

First, in step S1001 illustrated in FIG. 22, the CPU 121 transmits information about the image height distance, the aperture value, and the pupil distance during focus detection, to the CPU for the lens. The transmitted image height distance $r_{AF}$ is calculated by the equation (6).

Next, in step S1002 illustrated in FIG. 22, the CPU for the lens acquires the current zoom state ZS and focus state FS.

Next, in step S1003 illustrated in FIG. 22, the CPU for the lens acquires information about the object-side frame F1 (first opening information), the image-side frame F2 (second opening information), and the diaphragm frame F3 (third opening information) of the image capturing optical system, from the memory for the lens. In this case, the CPU for the lens acquires each piece of the opening information based on the image height distance and the aperture value, which are acquired in step S1001, and the zoom state ZS and focus state FS which are acquired in step S1002.

Next, in step S1004 illustrated in FIG. 22, the CPU for the lens calculates the central position and size of each piece of the opening information at the pupil distance of the image sensor 107. In this case, the CPU for the lens uses the information about the object-side frame F1 (first opening information), the image-side frame F2 (second opening information), the diaphragm frame F3 (third opening information) of the image capturing optical system, which are acquired in step S1003.

The central position and size of each piece of the opening information will now be described with reference to FIG. 23. FIG. 23 is a schematic relationship diagram illustrating the central position and size of each piece of the opening information at the pupil distance of the image sensor 107. As illustrated in FIG. 23, the respective central positions and sizes of the object-side frame F1 (first opening information), the image-side frame F2 (second opening information), and the diaphragm frame F3 (third opening information) of the image capturing optical system are represented by c1, r1, c2, r2, and c3, r3. In the present exemplary embodiment, c1, r1, c2, r2, and c3 are preliminarily calculated and stored in the memory for the lens for each image height distance, and r3 is calculated from the aperture value acquired in step S1001. However, the acquisition method is not limited to this method. The parameters may be stored as a table and each value may be acquired without performing any calculation.

Next, in step S1005 illustrated in FIG. 22, the CPU for the lens transmits, to the CPU 121, the central position and size of each piece of the opening information at the pupil distance of the image sensor 107. In this case, the CPU for the lens uses the information about the object-side frame F1 (first opening information), the image-side frame F2 (second opening information), and the diaphragm frame F3 (third opening information) of the image capturing optical system, which are acquired in step S1004.

Next, in step S1006 illustrated in FIG. 22, the CPU 121 calculates the rotation angle θ by an equation (15) based on the focus detection area.

$$\theta = a\,\tan\left(\frac{y}{x}\right) \quad (15)$$

Next, in step S1007 illustrated in FIG. 22, the CPU 121 calculates a vignetting ratio b1 of the diaphragm frame F3 due to the object-side frame F1 and a vignetting ratio b2 of the diaphragm frame F3 due to the image-side frame F2 by an equation (16A) and an equation (16B), respectively. In this case, the CPU 121 uses the central position and size of each piece of the opening information at the pupil distance of the image sensor 107, which is acquired in step S1005. The vignetting ratios b1 and b2 correspond to an upper-line frame and a lower-line frame (first opening information and second opening information), respectively, which are represented by information about a distance from a central position of a diaphragm frame (third opening information).

$$b1 = 1 - \frac{a1}{r3} = 1 - \frac{r1 - (c1 - c3)}{r3} \quad (16A)$$

$$b2 = 1 - \frac{a2}{r3} = 1 - \frac{r2 + (c2 - c3)}{r3} \quad (16B)$$

Next, in step S1008 illustrated in FIG. 22, the CPU 121 acquires, from the memory, the coefficients for a function about θ, b1, and b2, which are used for conversion coefficient calculation and determined depending on the central position and size of the diaphragm frame F3 (third opening information) of the image capturing optical system, which is acquired in step S1005. The coefficients are held in each divided range obtained by dividing θ into a plurality of ranges. In the present exemplary embodiment, the coefficients when a quadratic function for θ, b1, and b2 is used as the function are acquired. However, the function is not limited to a quadratic function, but instead may be a linear function or a cubic or higher-order function. Further, the order of a variable with a small variation may be reduced and the order of a variable with a large variation may be increased, to thereby set different orders for each variable.

Next, in step S1009 illustrated in FIG. 22, the CPU 121 calculates the conversion coefficient by equations (17A) and (17B). In this case, the CPU 121 uses the rotation angle θ acquired in step S1006, the vignetting ratios b1 and b2 acquired in step S1007, and the coefficients of the quadratic function for θ, b1, and b2 acquired in step S1008. In this case, BL represents the base line length, and m000 to m202 represent the coefficients acquired in step S1008.

$$\begin{aligned}BL = {}& m000 + m001 \cdot b1 + m002 \cdot b2 + m020 \cdot b1^2 + \\ & m011 \cdot b1 \cdot b2 + m002 \cdot b2^2 + m100 \cdot \theta + m101 \cdot \theta \cdot b1 + \\ & m110 \cdot \theta \cdot b2 + m120 \cdot \theta \cdot b1^2 + m111 \cdot \theta \cdot b1 \cdot b2 + \\ & m102 \cdot \theta \cdot b2^2 + m200 \cdot \theta^2 + m201 \cdot \theta^2 \cdot b1 + m202 \cdot \theta^2 \cdot b2 + \\ & m220 \cdot \theta^2 \cdot b1^2 + m211 \cdot \theta^2 \cdot b1 \cdot b2 + m202 \cdot \theta^2 \cdot b2^2\end{aligned} \quad (17A)$$

-continued $$K = \frac{1}{BL} \quad (17B)$$

With the configuration described above, the conversion coefficient for conversion from an image deviation amount between focus detection signals into a defocus amount can be calculated based on the opening state, which leads to an improvement in focus detection performance. In the present exemplary embodiment, the base line length is represented by the function of θ, b1, and b2 and calculated, but instead may be represented by a function using other parameters. Instead of holding the base line length in the form of a function, the base line length for each parameter may be directly held and the value between parameters may be calculated by linear interpolation or the like.

Next, a fourth exemplary embodiment of the disclosure will be described. The fourth exemplary embodiment differs from the third exemplary embodiment with regard to the conversion coefficient calculation method. The other components and operations in the fourth exemplary embodiment are similar to those in the first exemplary embodiment, and thus the descriptions thereof are omitted.

Figure 24:
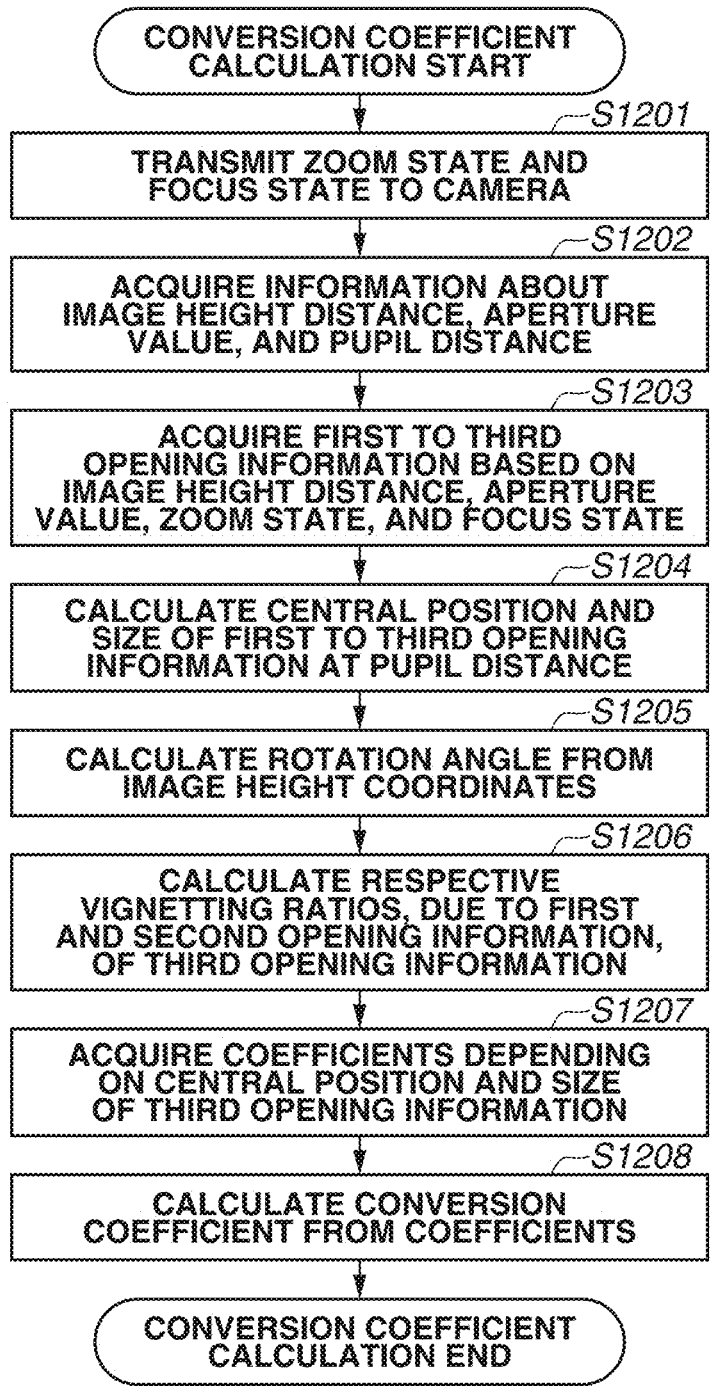
FIG. 24 is a flowchart illustrating a conversion coefficient calculation according to a fourth exemplary embodiment.

Referring to FIG. 24, the conversion coefficient calculation (step S105 illustrated in FIG. 13) according to the present exemplary embodiment will be described. FIG. 24 is a flowchart illustrating the conversion coefficient calculation according to the present exemplary embodiment. Each step illustrated in FIG. 24 is mainly executed by the CPU 121 or the CPU for the lens.

First, in step S1201 illustrated in FIG. 24, the CPU for the lens transmits the current zoom state ZS and focus state FS to the camera.

Next, in step S1202 illustrated in FIG. 24, the CPU 121 transmits information about the image height distance, the aperture value, and the pupil distance during focus detection, to the CPU for the lens. The transmitted image height distance $r_{AF}$ is calculated by the equation (6).

Next, in step S1203 illustrated in FIG. 24, the CPU for the lens acquires information about the object-side frame F1 (first opening information), the image-side frame F2 (second opening information), and the diaphragm frame F3 (third opening information) of the image capturing optical system from the memory for the lens. In this case, the CPU for the lens acquires the information based on the image height distance and aperture value acquired in step S1202, and the zoom state ZS and focus state FS acquired in step S1201.

Next, in step S1204 illustrated in FIG. 24, the CPU for the lens calculates the central position and size of each piece of the opening information at the pupil distance of the image sensor 107. In this case, the CPU for the lens uses information about the object-side frame F1 (first opening information), the image-side frame F2 (second opening information), and the diaphragm frame F3 (third opening information) of the image capturing optical system, which are acquired in step S1203.

Next, in step S1205 illustrated in FIG. 24, the CPU 121 calculates the rotation angle θ by the equation (15) based on the focus detection area.

Next, in step S1206 illustrated in FIG. 24, the CPU 121 calculates the vignetting ratio b1 of the diaphragm frame F3 due to the object-side frame F1 and the vignetting ratio b2 of the diaphragm frame F3 due to the image-side frame F2 by the equation (16) and the equation (17), respectively. In this case, the CPU 121 uses the central position and size of each piece of the opening information at the pupil distance of the image sensor 107, which is acquired in step S1204. The vignetting ratios b1 and b2 correspond to an upper-line frame and a lower-line frame (first opening information and second opening information), respectively, which are represented by information about the distance from the central position of the diaphragm frame (third opening information).

Next, in step S1207 illustrated in FIG. 24, the CPU 121 acquires, from the memory, the coefficients of a function for θ, b1, and b2 which are used for conversion coefficient calculation and determined depending on the central position and size of the diaphragm frame F3 (third opening information) of the image capturing optical system, which is acquired in step S1204. The coefficients are held in each divided range obtained by dividing θ into a plurality of ranges. In the present exemplary embodiment, the coefficients when a quadratic function for θ, b1, and b2 is used as the function are acquired. However, the functions is not limited to a quadratic function, but instead may be a linear function or a cubic or higher-order function. Further, the order of a variable with a small variation may be reduced and the order of a variable with a large variation may be increased, to thereby set different orders for each variable.

Next, in step S1208 illustrated in FIG. 24, the CPU 121 calculates the conversion coefficient by the equations (17A) and (17B). In this case, the CPU 121 uses the rotation angle θ acquired in step S1205, the vignetting ratios b1 and b2 acquired in step S1206, and the coefficients of the quadratic function for θ, b1, and b2 acquired in step S1207. In this case, BL represents the base line length, and m000 to m202 represent the coefficients acquired in step S1008.

With the configuration described above, the conversion coefficient for conversion from an image deviation amount between focus detection signals into a defocus amount can be calculated based on the opening state, which leads to an improvement in focus detection performance. In the present exemplary embodiment, the base line length is represented by the function of θ, b1, and b2 and calculated, but instead may be represented by a function using other parameters. Instead of holding the base line length in the form of a function, the base line length for each parameter may be directly held and the value between parameters may be calculated by linear interpolation or the like.

As illustrated in the first and second exemplary embodiments, the acquisition of the first to third opening information from parameters, the calculation of the vignetting ratios in the acquisition of the first to third opening information, and the calculation of the conversion coefficient have been described above. A part or the whole of the acquisition and calculation processing may be performed by a combination of the CPU 121 in the camera body with the CPU for the lens in the lens. Further, which one of the CPU 121 and the CPU for the lens is used for the processing may be controlled as needed.

Next, a fifth exemplary embodiment of the disclosure will be described. The fifth exemplary embodiment differs from the third exemplary embodiment in regard to the conversion coefficient calculation method. The other components and operations in the fifth exemplary embodiment are similar to those in the first exemplary embodiment, and thus the descriptions thereof are omitted.

Figure 25:
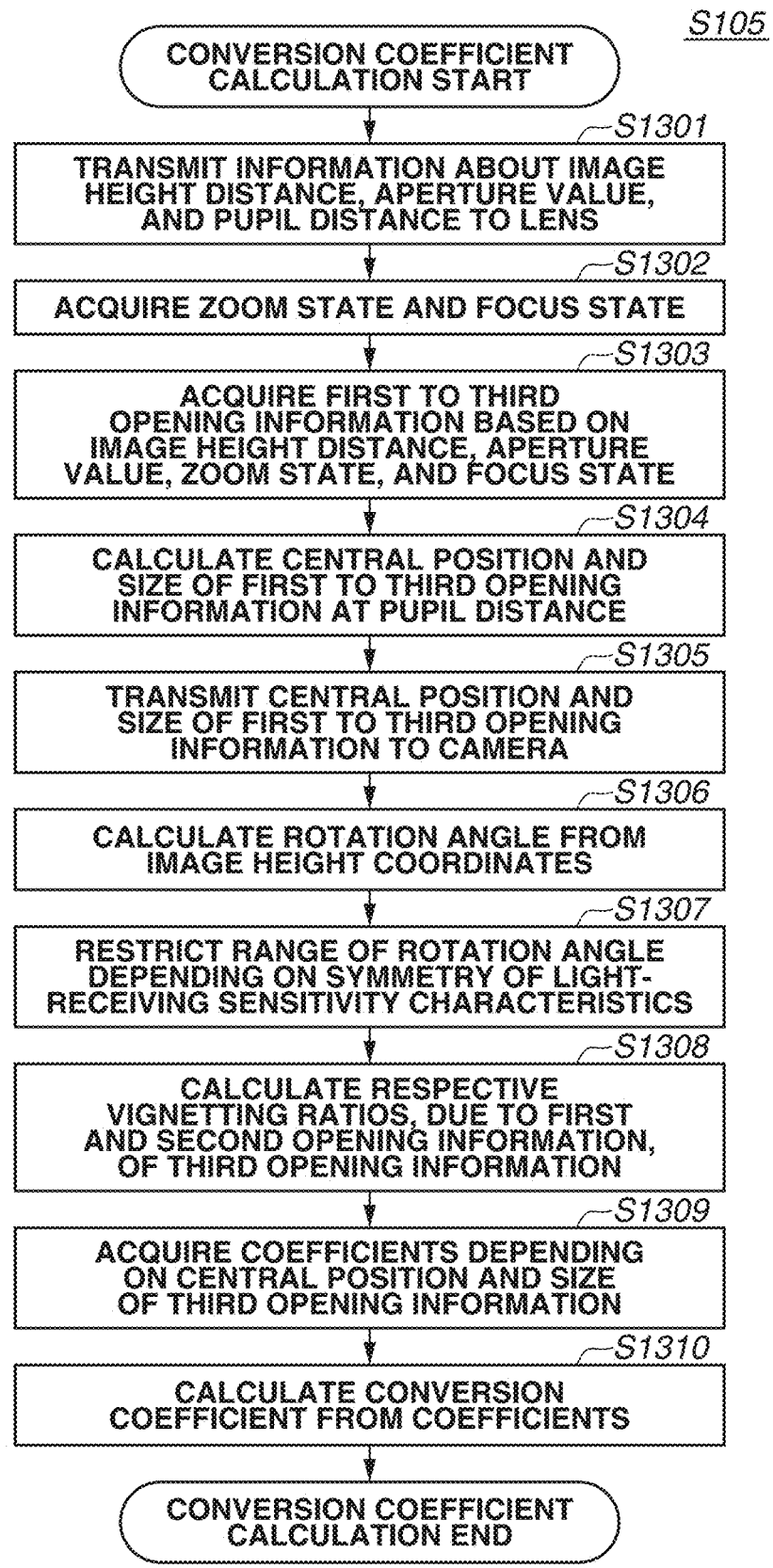
FIG. 25 is a flowchart illustrating a conversion coefficient calculation according to a fifth exemplary embodiment.

The conversion coefficient calculation according to the present exemplary embodiment will be described with reference to FIG. 25. FIG. 25 is a flowchart illustrating the conversion coefficient calculation according to the present exemplary embodiment. Each step illustrated in FIG. 25 is mainly executed by the CPU 121 or the CPU for the lens.

First, in step S1301 illustrated in FIG. 25, the CPU 121 transmits information about the image height distance, the aperture value, and the pupil distance during focus detection, to the CPU for the lens. The transmitted image height distance $r_{AF}$ is calculated by the equation (6).

Next, in step S1302 illustrated in FIG. 25, the CPU for the lens acquires the current zoom state ZS and focus state FS.

Next, in step S1303 illustrated in FIG. 25, the CPU for the lens acquires, from the memory for the lens, information about the object-side frame F1 (first opening information), the image-side frame F2 (second opening information), and the diaphragm frame F3 (third opening information) of the image capturing optical system. In this case, the CPU for the lens acquires each piece of the opening information based on the image height distance and aperture value acquired in step S1301, and the zoom state ZS and focus state FS acquired in step S1302.

Next, in step S1304 illustrated in FIG. 25, the CPU for the lens calculates the central position and size of each piece of the opening information at the pupil distance of the image sensor 107. In this case, the CPU for the lens uses the information about the object-side frame F1 (first opening information), the image-side frame F2 (second opening information), and the diaphragm frame F3 (third opening information) of the image capturing optical system, which are acquired in step S1303.

Next, in step S1305 illustrated in FIG. 25, the CPU for the lens transmits, to the CPU 121, the central position and size of each piece of the opening information at the pupil distance of the image sensor 107. In this case, the CPU for the lens uses the information about the object-side frame F1 (first opening information), the image-side frame F2 (second opening information), and the diaphragm frame F3 (third opening information) of the image capturing optical system, which are acquired in step S1304.

Next, in step S1306 illustrated in FIG. 25, the CPU 121 calculates the rotation angle θ by the equation (15) based on the focus detection area.

Next, in step S1307 illustrated in FIG. 25, the CPU 121 limits the range of the rotation angle θ acquired in step S1306 based on the symmetry of light-receiving sensitivity characteristics of the image sensor 107. If the light-receiving sensitivity characteristics of the image sensor 107 are vertically symmetric (symmetric with respect to the x-axis) at the pupil distance of the image sensor 107, the light-receiving sensitivity characteristics are equal when the rotation angle θ is in a range of $0 \le \theta \le \pi$ and in a range of $\pi \le \theta \le 2\pi$. Accordingly, in the range of $\pi \le \theta \le 2\pi$, the base line length can be calculated by substituting the rotation angle into the equation (17A) assuming that $\theta' = 2\pi - \theta$ ($\pi \le \theta \le 2\pi$). Thus, the coefficients to be stored in the memory can be reduced to ½ by limiting the range of the rotation angle. When the focus detection is performed on a plurality of focus detection areas, a part of the conversion coefficient calculation can be omitted.

Further, when the light-receiving sensitivity characteristics of the image sensor 107 are vertically and horizontally symmetric (symmetric with respect to the x-axis and symmetric with respect to the y-axis) at the pupil distance of the image sensor 107, the light-receiving sensitivity characteristics are equal when the rotation angle θ is in a range of $0 \le \theta \le \pi/2$, in a range $\pi/2 \le \theta \le \pi$, in a range of $\pi \le \theta \le 3\pi/2$, and in a range of $3\pi/2 \le \theta \le 2\pi$. Accordingly, in the range of $\pi/2 \le \theta \le \pi$, $\theta' = \pi - \theta$ ($\pi/2 \le \theta \le \pi$) holds, in the range of $\pi \le \theta \le 3\pi/2$, $\theta' = 3\pi/2 - \theta$ ($\eta \le \theta \le 3\pi/2$) holds, and in the range of $3\pi/2 \le \theta \le 2\pi$, $\theta' = 2\pi - \theta$ ($3\pi/2 \le \theta \le 2\pi$) holds. Further, the base line length can be calculated by substituting the rotation angle into the equation (17A). Thus, when the light-receiving sensitivity characteristics of the image sensor 107 are vertically and horizontally symmetric, the coefficients to be stored in the memory can be reduced to ¼.

Next, in step S1308 illustrated in FIG. 25, the CPU 121 calculates the vignetting ratio b1 of the diaphragm frame F3 due to the object-side frame F1 and the vignetting ratio b2 of the diaphragm frame F3 due to the image-side frame F2 by the equation (16A) and the equation (16B), respectively. In this case, the CPU 121 uses the central position and size of each piece of the opening information at the pupil distance of the image sensor 107, which is acquired in step S1305. The vignetting ratios b1 and b2 correspond to an upper-line frame and a lower-line frame (first opening information and second opening information), respectively, which are represented by information about a distance from the central position of the diaphragm frame (third opening information).

Next, in step S1309 illustrated in FIG. 25, the CPU 121 acquires, from the memory, the coefficients for a function about θ, b1, and b2, which are used for conversion coefficient calculation and determined depending on the central position and size of the diaphragm frame F3 (third opening information) of the image capturing optical system, which are acquired in step S1305. The coefficients are held in each divided range obtained by dividing θ into a plurality of ranges. In the present exemplary embodiment, the coefficients when a quadratic function for θ, b1, and b2 is used as the function are acquired. However, the function is not limited to a quadratic function, but instead may be a linear function or a cubic or higher-order function. Further, the order of a variable with a small variation may be reduced and the order of a variable with a large variation may be increased, to thereby set different orders for each variable. In the present exemplary embodiment, the coefficients based on the central position and size of each piece of the opening information at the pupil distance are acquired. Alternatively, the coefficients based on the central position and size of each piece of the opening information at a distance where the symmetry of the light-receiving sensitivity characteristics of the image sensor 107 is high may be acquired.

Next, in step S1310 illustrated in FIG. 25, the CPU 121 calculates the conversion coefficient by the equations (17A) and (17B). In this case, the CPU 121 uses the rotation angle θ which is acquired in step S1306 and whose range is limited in step S1307, the vignetting ratios b1 and b2 acquired in step S1308, and the coefficients of the quadratic function for θ, b1, and b2 acquired in step S1309. In this case, BL represents the base line length, and m000 to m202 represent the coefficients acquired in step S1309.

With the configuration described above, the conversion coefficient for conversion from an image deviation amount between focus detection signals into a defocus amount can be calculated based on the opening state, which leads to an improvement in focus detection performance. In the present exemplary embodiment, the base line length is represented by a function of θ, b1, and b2 and calculated, but instead may be represented by a function using other parameters. Instead of holding the base line length in the form of a function, the base line length may be directly held for each parameter, and the value between parameters may be calculated by linear interpolation or the like.

Other Exemplary Embodiments

The image capturing unit and the image capturing apparatus described in the exemplary embodiments can be applied to various applications. For example, the image capturing unit can be used for sensing of light, such as infrared rays, ultraviolet rays, and X-rays, in addition to visible light. In addition, the image capturing apparatus is typified by a digital camera, but can also be applied to a camera-equipped mobile phone, such as a smartphone, a monitoring camera, a game device, and the like. Further, the image capturing apparatus can be applied to an endoscope, a medical device for capturing an image of a blood vessel, a cosmetic device for observing skin or scalp, and a video camera for capturing a moving image of sports or actions. Furthermore, the image capturing apparatus can be applied to cameras for traffic purposes, such as traffic or marine monitoring and a drive recorder, cameras for academic purposes, such as astronomical observation or specimen observation, camera-equipped home electric appliances, machine vision, and the like. In particular, the machine vision is not limited to robots used in factories and the like, but also can be used in agriculture and fisheries.

The configuration of the image capturing apparatus described in the exemplary embodiments is illustrated by way of example only, and the image capturing apparatus to which the disclosure can be applied is not limited to the configuration illustrated in FIG. 1. The circuit configuration of each unit of the image capturing apparatus is also not limited to the configurations illustrated in the drawings.

The disclosure can also be implemented by processing in which a program for implementing one or more functions according to the exemplary embodiments described above is supplied to a system or an apparatus via a network or a storage medium, and one or more processors in a computer of the system or the apparatus read out and execute the program. The disclosure can also be implemented by a circuit (e.g., an application specific integrated circuit (ASIC)) for implementing one or more functions according to the exemplary embodiments described above.

While exemplary embodiments of the disclosure have been described above, the disclosure is not limited to these exemplary embodiments. The aspect of the embodiments can be modified or changed in various ways within the scope of the invention.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-118126, filed Jun. 21, 2018, and No. 2018-118127, filed Jun. 21, 2018, which are hereby incorporated by reference herein in their entirety.

What is claimed is:

1. An apparatus comprising:
a controller having a processor which executes instructions stored in a memory, the controller being configured to function as:
a generation unit configured to generate a plurality of respective focus detection signals corresponding to different pupil areas of an imaging optical system by using an image sensor including an array of a plurality of pixels configured to receive light having passed through the different pupil areas, and pixel signals acquired by the pixels; and
a detection unit configured to detect a defocus amount from an image deviation amount calculated from the plurality of focus detection signals and a conversion coefficient based on opening information about a plurality of frames forming the pupil areas in the imaging optical system,
wherein the opening information about the plurality of frames in the imaging optical system is determined based on a center and a radius of the plurality of frames included in the imaging optical system.

2. The apparatus according to claim 1, wherein the detection unit calculates the conversion coefficient based on a pupil eccentric amount of the image sensor, an incident pupil distance of the image sensor, and the opening information about the plurality of frames in the imaging optical system.

3. The apparatus according to claim 2, wherein the detection unit determines a pupil partial area based on the pupil eccentric amount, the incident pupil distance of the image sensor, and the opening information about the plurality of frames in the imaging optical system, and calculates the conversion coefficient based on the pupil partial area.

4. The apparatus according to claim 1-2, wherein the pupil eccentric amount is an amount of eccentricity, caused due to variations during production, of a pupil intensity distribution with respect to an optical axis.

5. The apparatus according to claim 1, wherein the controller is configured to further function as an acquisition unit configured to acquire the pixel signals under a predetermined acquisition condition from the array of the plurality of pixels in the image sensor,
wherein the detection unit calculates the conversion coefficient based on the acquisition condition.

6. The apparatus according to claim 1, wherein the opening information includes a diaphragm frame included in the imaging optical system.

7. The apparatus according to claim 1, wherein the opening information includes information about a plurality of frames having different radii or curvatures.

8. The apparatus according to claim 1, wherein the detection unit calculates the conversion coefficient based on a distance between centers of the plurality of frames.

9. The apparatus according to claim 1, further comprising a storage unit configured to store the conversion coefficient calculated based on a pupil eccentric amount of the image sensor, an incident pupil distance of the image sensor, and the opening information about the plurality of frames in the imaging optical system.

10. The apparatus according to claim 1, further comprising a storage unit configured to store a coefficient in a case where the conversion coefficient is represented as a function of the opening information about the plurality of frames in the imaging optical system,
wherein the detection unit calculates the conversion coefficient by using the coefficient.

11. An apparatus comprising:
a controller having a processor which executes instructions stored in a memory, the controller being configured to function as:
a generation unit configured to generate a plurality of respective focus detection signals corresponding to different pupil areas of an imaging optical system by using an image sensor including an array of a plurality of pixels configured to receive light having passed through the different pupil areas, and pixel signals acquired by the pixels; and
a detection unit configured to detect a defocus amount from an image deviation amount calculated from the plurality of focus detection signals and a conversion coefficient based on opening information about a plurality of frames forming the pupil areas in the imaging optical system,
wherein the detection unit calculates the conversion coefficient depending on a rotation angle corresponding to an image height of the image sensor.

12. The apparatus according to claim 11, wherein a range of the rotation angle is limited based on symmetry of light-receiving sensitivity characteristics of the image sensor.

13. An apparatus comprising:
the apparatus according to claim 1
wherein the controller is configured to further function as
a control unit configured to control the imaging optical system, and
wherein the control unit controls a focus position of the imaging optical system based on the detected defocus amount.

14. An apparatus comprising:
the apparatus according to claim 1; and
a mount portion to be detachably attached to the imaging optical system,
wherein the controller is configured to further function as:
a communication unit configured to communicate with the imaging optical system via the mount portion, and
wherein the communication unit performs communication at a timing when an image signal is acquired, or at a predetermined period, and the opening information about the plurality of frames in the imaging optical system is acquired by the imaging optical system.

15. An imaging optical system comprising:
a lens including a plurality of lens groups and configured to adjust a focus state of the plurality of lens groups in accordance with a calculated image deviation amount in pixel signals from an image sensor included in an image capturing apparatus:

a memory storing opening information about a plurality of frames used to calculate a conversion coefficient for converting the image deviation amount into a defocus amount; and
a controller having a processor which executes instructions stored in the memory, the controller being configured to function as:
a transmission unit configured to transmit the opening information about the plurality of frames to calculate the defocus amount in the image capturing apparatus,
wherein the opening information about the plurality of frames is related to a center and a radius of the plurality of frames included in the imaging optical system.

16. An apparatus that calculates a defocus amount based on pixel signals obtained by performing a photoelectric conversion of light having passed through different pupil areas in an imaging optical system, the apparatus comprising:
a controller having a processor which executes instructions stored in a memory, the controller being configured to function as:
a generation unit configured to generate a plurality of respective focus detection signals corresponding to the different pupil areas, based on the pixel signals; and
a calculation unit configured to calculate the defocus amount from a detection image deviation amount based on the generated plurality of focus detection signals and a conversion coefficient,
wherein the calculation unit generates a plurality of respective virtual focus detection signals corresponding to the different pupil areas by setting a virtual defocus amount, calculates a virtual image deviation amount from a correlation amount of the virtual focus detection signals, and determines the conversion coefficient based on the virtual image deviation amount and the virtual defocus amount.

17. The apparatus according to claim 16, wherein the detection unit sets a virtual defocus amount under a plurality of conditions, generates a plurality of respective virtual focus detection signals corresponding to the different pupil areas, calculates a plurality of virtual image deviation amounts from a correlation amount of the plurality of virtual focus detection signals, and calculates the conversion coefficient based on the plurality of virtual image deviation amounts and the virtual defocus amount.

18. A method that performs a focus detection using pixel signals obtained by performing a photoelectric conversion of light having passed through different pupil areas in an imaging optical system, the method comprising:
acquiring the pixel signals;
generating a plurality of respective focus detection signals corresponding to the different pupil areas by using the pixel signals; and
performing focus detection by calculating a detection image deviation amount based on the plurality of focus detection signals and detecting a detection defocus amount from the detection image deviation amount and a conversion coefficient,
wherein the performing focus detection includes:
generating a plurality of respective virtual focus detection signals corresponding to the different pupil areas by setting a virtual defocus amount;
calculating a virtual image deviation amount from a correlation amount of the virtual focus detection signals; and calculating the conversion coefficient based on the virtual image deviation amount and the virtual defocus amount.

19. The imaging optical system according to claim 15, wherein the transmission unit performs communication at a timing when an image signal is acquired, or at a predetermined period, and transmits the opening information about the plurality of frames.

20. The imaging optical system according to claim 15, wherein the transmission unit performs communication at a timing of lens replacement or at a timing of startup, and transmits the opening information about the plurality of frames.

21. The imagining optical system according to claim 15, wherein the opening information includes a diaphragm frame included in the imaging optical system.

22. The imagining optical system according to claim 15, wherein the opening information includes information about a plurality of frames having different radii or curvatures.

* * * * *